United States Patent
Kawata et al.

(10) Patent No.: US 11,393,143 B2
(45) Date of Patent: Jul. 19, 2022

(54) PROCESS STATE ANALYSIS DEVICE AND PROCESS STATE DISPLAY METHOD

(71) Applicant: HITACHI, LTD., Tokyo (JP)

(72) Inventors: Miyuki Kawata, Chiyoda-ku (JP); Seunghwan Park, Chiyoda-ku (JP); Yoshiyuki Takamori, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/254,627

(22) PCT Filed: May 23, 2019

(86) PCT No.: PCT/JP2019/020466
§ 371 (c)(1),
(2) Date: Dec. 21, 2020

(87) PCT Pub. No.: WO2020/066124
PCT Pub. Date: Apr. 2, 2020

(65) Prior Publication Data
US 2021/0125387 A1 Apr. 29, 2021

(30) Foreign Application Priority Data
Sep. 26, 2018 (JP) .............................. JP2018-180785

(51) Int. Cl.
*G06T 11/00* (2006.01)
*G06F 3/14* (2006.01)
(Continued)

(52) U.S. Cl.
CPC ........ *G06T 11/206* (2013.01); *G05B 23/0221* (2013.01); *G06F 3/14* (2013.01);
(Continued)

(58) Field of Classification Search
CPC . G06T 11/206; G06T 11/001; G05B 23/0221; G06F 3/14
(Continued)

(56) References Cited

U.S. PATENT DOCUMENTS

2002/0135597 A1* 9/2002 Kagawa .................. G09G 5/02
345/600
2010/0249976 A1 9/2010 Aharoni et al.
(Continued)

FOREIGN PATENT DOCUMENTS

JP 2005-258649 A 9/2005
JP 2011-175437 A 9/2011
(Continued)

OTHER PUBLICATIONS

International Search Report with English translation and Written Opinion issued in corresponding application No. PCT/JP2019/020466 dated Aug. 20, 2019.

*Primary Examiner* — Hai Tao Sun
(74) *Attorney, Agent, or Firm* — Foley & Lardner LLP

(57) ABSTRACT

An embodiment of the process state analysis device of the present invention is provided with an evaluation value calculation unit and a graph creation unit. The evaluation value calculation unit calculates, within an evaluation value calculation range indicating a target range for calculating evaluation values, an evaluation value for each cluster that is classified on the basis of multi-dimensional process data output from each measurement device. The graph creation unit determines a hue for a graph element for each cluster on the basis of the evaluation value for the cluster as calculated within the evaluation value calculation range, and on the basis of a color reference evaluation value corresponding to a reference hue for the graph element, and creates and outputs a graph representing, for each aggregation unit time
(Continued)

interval in a specified display period, the number of nodes belonging to each cluster.

10 Claims, 17 Drawing Sheets

(51) Int. Cl.
  *G06T 11/20* (2006.01)
  *G05B 23/02* (2006.01)
  *G06Q 10/06* (2012.01)
  *G06Q 50/04* (2012.01)
(52) U.S. Cl.
  CPC ........ *G06T 11/001* (2013.01); *G06Q 10/0639* (2013.01); *G06Q 50/04* (2013.01)
(58) Field of Classification Search
  USPC .......................................................... 345/589
  See application file for complete search history.

(56) References Cited

U.S. PATENT DOCUMENTS

| | | |
|---|---|---|
| 2011/0209083 A1 | 8/2011 | Yokegawa et al. |
| 2015/0058778 A1* | 2/2015 | Tokuoka ............ G05B 23/0224 |
| | | 715/771 |
| 2015/0213706 A1* | 7/2015 | Bai .................... G05B 23/0221 |
| | | 340/635 |
| 2019/0227531 A1 | 7/2019 | Hori et al. |
| 2020/0012269 A1 | 1/2020 | Hori et al. |

FOREIGN PATENT DOCUMENTS

| | | |
|---|---|---|
| JP | 2015-041256 A | 3/2015 |
| JP | 2018-049314 A | 3/2018 |
| JP | 2018-147360 A | 9/2018 |
| WO | WO-2012/073289 A1 | 6/2012 |

* cited by examiner

FIG. 1

|  | CLUSTER 1 ||| CLUSTER 2 |||
|---|---|---|---|---|---|---|
| DATE | FINAL INSPECTION RESULT IS Pass [PIECES] | FINAL INSPECTION RESULT IS False [PIECES] | EVALUATION VALUE (DEFECTIVE RATE) [%] | FINAL INSPECTION RESULT IS Pass [PIECES] | FINAL INSPECTION RESULT IS False [PIECES] | EVALUATION VALUE (DEFECTIVE RATE) [%] |
| 1/3 | 27 | 3 | 10.0 | 40 | 0 | 0.0 |
| 1/4 | 45 | 5 | 10.0 | 30 | 0 | 0.0 |
| 1/5 | 36 | 4 | 10.0 | 35 | 0 | 0.0 |
| 1/6 | 27 | 3 | 10.0 | 18 | 6 | 25.0 |
| 1/7 | 36 | 4 | 10.0 | 12 | 4 | 25.0 |
| 1/3-7 | 171 | 19 | 10.0 | 135 | 10 | 6.9 |
| 1/6-7 | 63 | 7 | 10.0 | 30 | 10 | 25.0 |

FIG. 2

|  | CLUSTER 1 ||| CLUSTER 2 |||
|---|---|---|---|---|---|---|
| DATE | FINAL INSPECTION RESULT IS Pass [PIECES] | FINAL INSPECTION RESULT IS False [PIECES] | EVALUATION VALUE (DEFECTIVE RATE) [%] | FINAL INSPECTION RESULT IS Pass [PIECES] | FINAL INSPECTION RESULT IS False [PIECES] | EVALUATION VALUE (DEFECTIVE RATE) [%] |
| 1/3 | 40 | 0 | 0.0 | 2 | 0 | 0.0 |
| 1/4 | 40 | 0 | 0.0 | 2 | 0 | 0.0 |
| 1/5 | 27 | 3 | 10.0 | 9 | 1 | 10.0 |
| 1/6 | 15 | 5 | 25.0 | 15 | 5 | 25.0 |
| 1/7 | 15 | 5 | 25.0 | 15 | 5 | 25.0 |
| 1/3-7 | 137 | 13 | 8.7 | 43 | 11 | 20.4 |
| 1/6-7 | 30 | 10 | 25.0 | 30 | 10 | 25.0 |

FIG. 4

| INDIVIDUAL IDENTIFICATION NUMBER | DATE/TIME | PROCESS IDENTIFICATION CODE | MEASUREMENT ITEM | VALUE |
|---|---|---|---|---|
| A001001 | 2018/7/1 10:01:00 | OP01 | COMPONENT A PRESS-FIT PRESSURE | 2.32 |
| A001001 | 2018/7/1 10:01:30 | OP01 | COMPONENT A PRESS-FIT DISTANCE | 0.55 |
| : | 2018/7/1 10:02:05 | OP01 | COMPONENT A PRESS-FIT RESULT | PASS |
| : | : | : | : | : |
| A001002 | : | OP01 | COMPONENT A PRESS-FIT PRESSURE | 2.02 |
| : | : | : | : | : |
| A001002 | : | OP01 | COMPONENT A PRESS-FIT RESULT | FAIL |
| : | : | : | : | : |
| A001001 | 2018/7/1 10:43:22 | OP10 | FINAL INSPECTION RESULT | PASS |
| : | : | : | : | : |
| A001002 | : | : | : | : |

| DATA IDENTIFICATION NUMBER | COMPONENT A PRESS-FIT PRESSURE | COMPONENT A PRESS-FIT DISTANCE | ... | ... |
|---|---|---|---|---|
| 1 | 0.85 | 0.88 | ... | ... |
| 2 | 0.77 | 0.60 | | |
| 4 | : | : | ... | ... |
| : | : | : | ... | ... |

| DATA IDENTIFICATION NUMBER | CLUSTER NUMBER | DATE/TIME | FINAL INSPECTION RESULT |
|---|---|---|---|
| 1 | 1 | 2018/7/1 10:43:22 | PASS |
| 2 | 1 | : | PASS |
| 4 | 2 | : | FALSE |
| : | : | : | : |

20D

PROCESS STATE ANALYSIS DEVICE AND PROCESS STATE DISPLAY METHOD

TECHNICAL FIELD

The present invention relates to a process state analysis device and a process state display method for analyzing the process state of a plant to be monitored.

BACKGROUND ART

When a defective product occurs in the manufacturing process of an industrial product, if it takes more time to search for the cause of the defect, which will increase the loss. In order to suppress loss, it is necessary to narrow down the cause of defect early and detect quality changes early. In order to support this, a method of installing various measurement devices (sensors) in a manufacturing plant, collecting actual values of each manufacturing process from various measurement devices, and performing multivariate analysis is being studied. For example, the techniques described in Patent Literature 1 and Patent Literature 2 are disclosed.

Patent Literature 1 describes the method of applying the Mahalanobis-Taguchi method (MT method) to the manufacturing process data to perform normal/abnormal (quality pass/fail) determination processing and displaying the determination result on a display screen.

Patent Literature 2 describes the method of clustering plant operation data and classifying it into categories, calculating a representative value of the operation data for each category, and two-dimensionally mapping identification information of each category according to similarities of the representative values to show an evaluation value of each category based on the operation data in a three-dimensional graph with the evaluation value as a third axis.

The techniques described in Patent Literature 1 and Patent Literature 2 calculate the evaluation value on the basis of the measured value (manufacturing process data, operation data) of the measurement device installed in the plant. The methods described in these two patent literatures are particularly effective for abnormality diagnosis in a plant.

CITATION LIST

Patent Literature

PTL 1: JP 2011-175437 A
PTL 1: JP 2018-049314 A

SUMMARY OF INVENTION

Technical Problem

Incidentally, in the manufacturing process of industrial products, there are various kinds of changes in process states such as quality of purchased materials, process control instructions, equipment conditions, skill of workers, and the like, and discontinuous changes frequently occur or disappear. The pattern of change is characterized by a small number, many types, and no experience.

On the other hand, in the manufacturing process of industrial products, there are many changes in the process state in which the measured values may change significantly, such as the shift of the measurement base value due to the calibration of the equipment and the change of the process control instruction due to the change of the product type.

Therefore, the abnormality diagnosis using the evaluation value based on the measured value includes many so-called false alarms in which the state is judged to be abnormal although it is normal. Conversely, in the abnormality diagnosis using the evaluation value based on the measured value, there is a possibility that the change leading to poor quality may be buried and missed. Changes in unmeasured factors cannot be directly detected by multi-dimensional data analysis.

In view of the above situation, an object of the present invention is to appropriately grasp the process state and prevent erroneous judgment.

Solution to Problem

A process state analysis device according to one aspect of the present invention includes an evaluation value calculation unit and a graph creation unit.

The evaluation value calculation unit calculates an evaluation value for each cluster, for the cluster classified based on multi-dimensional process data output from a plurality of types of measurement devices installed in a target plant, in an evaluation value calculation range indicating a target range for calculating the evaluation value, which is a value of an evaluation item of the cluster.

The graph creation unit determines a hue of a graph element of each cluster on the basis of the evaluation value of the cluster in the evaluation value calculation range calculated by the evaluation value calculation unit and a color reference evaluation value corresponding to a hue that is a reference of the graph element, and creates and outputs a graph representing the number of nodes belonging to each cluster for each aggregation unit time in a specified display period.

Advantageous Effects of Invention

According to at least one aspect of the present invention, it is possible to appropriately grasp the process state and prevent erroneous determination. The problems, configurations, and effects other than those described above will be clarified from the description of the embodiments below.

BRIEF DESCRIPTION OF DRAWINGS

FIG. 1 shows an example of Simpson's paradox.
FIG. 2 shows another example of Simpson's paradox.
FIG. 4 is a diagram showing an example of process result data stored in a process result database.
FIG. 5 is a diagram showing a state in which process result data has been preprocessed.
FIG. 6 is a diagram showing an example of cluster data stored in a cluster result data storage unit.

DESCRIPTION OF EMBODIMENTS

Figure 3:
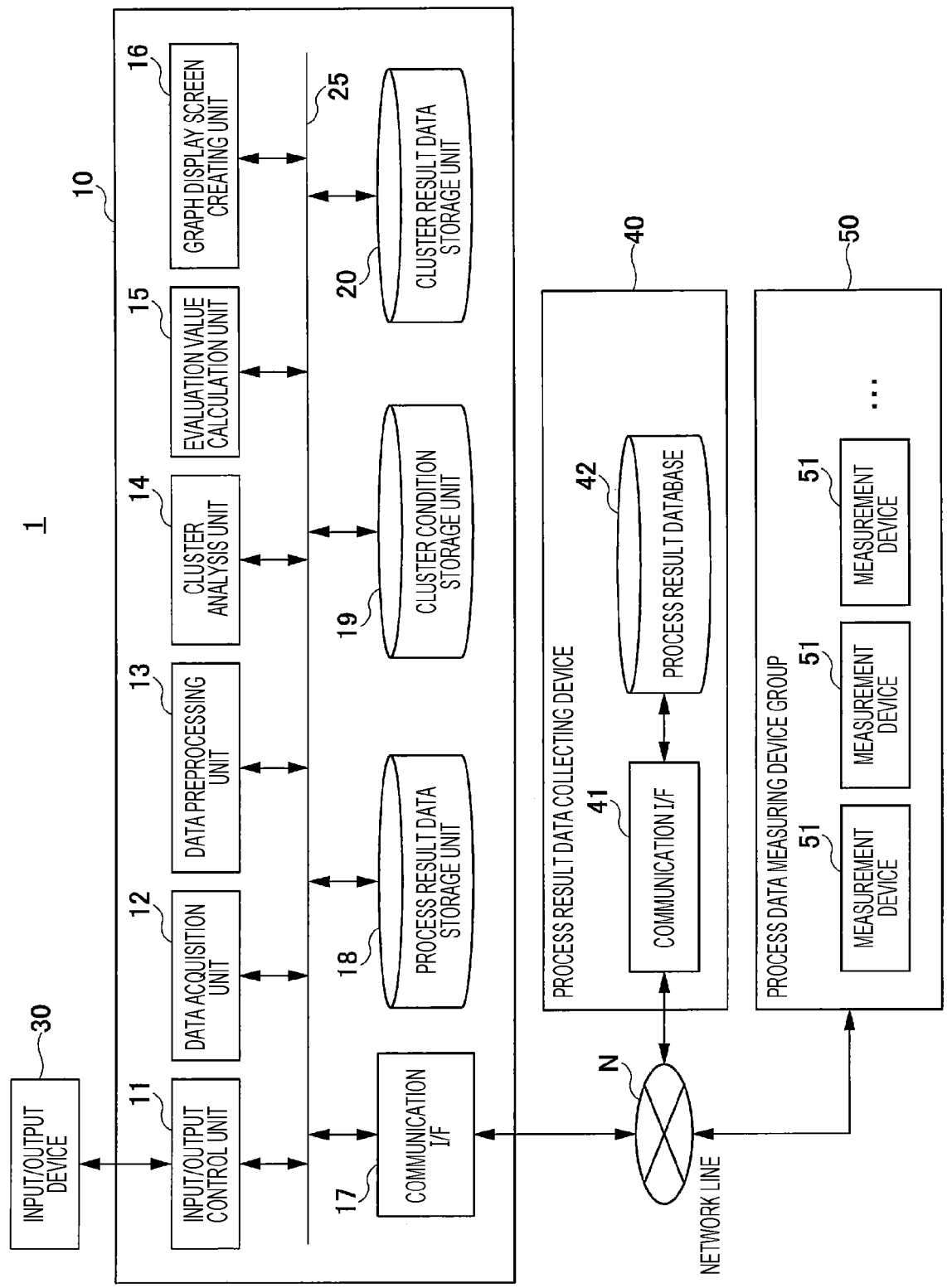
FIG. 3 is a diagram showing an overall configuration example of a plant monitoring system and a functional configuration example of a process state analysis device according to a first embodiment of the present invention.

Hereinafter, examples of modes for carrying out the present invention will be described with reference to the accompanying drawings. In the present specification and the accompanying drawings, components having substantially the same function or configuration are designated by the same reference numerals, and duplicate description will be omitted.

First Embodiment

As described above, in the manufacturing process of industrial products, there are various kinds of process changes, and discontinuous changes frequently occur or disappear. In addition, the pattern of change is characterized by a small number, many types, and no experience. Considering these points, the inventors considered that unsupervised clustering is suitable for appropriately extracting the process change. That is, a defective rate indicating the ratio of the defective products in the cluster is eventually suitable for the evaluation value indicating the state of the industrial product in the manufacturing process. Here, there are the following problems.

The manufacturing process state has many changes, and even if the manufacturing line and manufactured product are the same, the threshold value of the defective rate in question is not constant. For example, the threshold value for determining a defective product is set to a value at which the manufacturing plant maintains the highest profit margin state in view of the balance between the yield and the production amount. Therefore, it is difficult to determine an abnormal value from the measured value or to determine the degree of abnormality as a threshold value in advance. Further, even when the occurrence of defects becomes a problem, the change in the process state is often not measured.

As one means for solving the above problem, the first embodiment of the present invention is configured as follows.

(1) A plurality of pieces of manufacturing result data linked to individual products or lots are classified into clusters by a (known) unsupervised clustering method.

(2) A bar graph that accumulates the number of nodes in each cluster is created for each aggregation unit time (setting time).

(3) The color of the bar graph is calculated based on the evaluation value (defective rate in this embodiment) of each cluster and the color-coding reference value.

(4) The evaluation value calculation range indicating the target period for calculating the evaluation value of the cluster (see FIG. 10 to be described later) and the color-coding reference value are made possible to enter by a person from the graph display screen, and the evaluation value and the graph color are calculated (recalculated) according to the input value to update the drawing contents.

The above configurations (3) and (4) can reduce judgment errors called Simpson's paradox in which evaluation values can be reversed due to differences in evaluation value calculation ranges even for the same cluster. Further, the above configurations (3) and (4) help a person to estimate the existence of an unmeasured factor that affects the evaluation value. The details will be described below.

[Evaluation Value Calculation Range]

FIG. 1 shows an example of Simpson's paradox. FIG. 1 shows an example in which a defective rate [%] is calculated as an evaluation value, assuming two clusters resulting from clustering. For the target product, the number of final inspection results that are good (Pass) or bad (False) is aggregated every day for each cluster. In this example, as shown in FIG. 1, in the five days from January 3 to January 7, the daily evaluation value (defective rate) of Cluster 1 is constant at 10%. In Cluster 2, the defective rate was zero during the first three days, and the defective rate was relatively high at 25% during the second two days.

In this case, when the defective rate is calculated for the entire five days, the defective rate of Cluster 1 is 10% and the defective rate of Cluster 2 is 6.9%, which is higher in Cluster 1. However, when the two days from January 6 to January 7 are targeted, the defective rate of Cluster 1 is 10%, the defective rate of Cluster 2 is 25%, and Cluster 2 is higher. In this way, by adding the parameter of the period (time) in addition to the parameter of the cluster, a so-called Simpson's paradox in which the evaluation value is reversed may occur.

FIG. 2 shows another example of Simpson's paradox. In this example, as shown in FIG. 2, the daily defective rate is the same between Cluster 1 and Cluster 2 for five days from January 3 to January 7. Nevertheless, the overall defective rate for five days is higher in Cluster 2, with 8.7% in Cluster 1 and 20.4% in Cluster 2. The defective rate for the entire five days is affected by the daily fluctuations in production, and cannot be said to be an appropriate evaluation value. On the other hand, when the two days from January 6 to January 7 are targeted, the defective rate is 25% for both Cluster 1 and Cluster 2.

Considering the above two examples further, in the example of FIG. 1, only Cluster 2 is affected during the two days from January 6 to January 7, which indicates a possibility that some sort of unmeasured (not appearing in the collected process data) change has occurred. On the other hand, in the example of FIG. 2, regardless of the type of cluster, the defective rate rises day by day, which indicates a situation where some sort of unmeasured change is increasing.

In this way, by allowing the evaluation value calculation range to be expanded or narrowed immediately so that changes in evaluation values between clusters can be compared, it is possible for an administrator to notice the existence of an abnormality of an unmeasured factor. The definition of the evaluation value calculation range is not limited to the time axis such as date and time. The evaluation value calculation range may be defined using other parameters that can divide the process data, such as the number of pieces of data, model, manufacturing site, and the like.

[Color Reference Evaluation Value]

Next, the color reference evaluation value and the color upper limit evaluation value will be described.

As described above, the present invention has a configuration in which the hue of the graph element is changed according to the evaluation value based on the set evaluation value calculation range. The color reference evaluation value is a reference value for expressing the color of the graph element by a plurality of hues and indicating the degree thereof by the darkness. For example, when the color of the graph element is represented by two hues of red and blue, the red is darker as the evaluation value is larger than the color reference evaluation value (more red component), and the blue is darker as it is smaller than the color reference evaluation value (more blue component). In the following description, the hue may be simply referred to as "color".

For example, when the defective rate is applied to the evaluation value, since the lower limit value is 0%, when the calculated evaluation value is the same as the color reference evaluation value, the blue density (component) is set to zero, and the blue is made darker as the evaluation value approaches 0%.

On the other hand, although the upper limit value of the defective rate is theoretically 100%, it is actually a low level in many cases. In addition, there are cases where there is no upper limit for parameters other than the defective rate. For making it easy for the administrator to distinguish the difference in color (darkness) between clusters even in a case where the color reference evaluation value is set low, and for a case where a parameter with no upper limit value is used for the evaluation value, the color upper limit evaluation value that makes red the darkest is specified. When the calculated evaluation value is equal to or exceeds the color upper limit evaluation value, the depth of red is maximized, and the closer the evaluation value is to the color reference evaluation value, the lighter the red is made.

In this way, when trying to confirm the difference between the evaluation values of Cluster 1 and Cluster 2 and the way the evaluation values are reversed while changing the evaluation value calculation range for the examples of FIGS. 1 and 2, the administrator can intuitively and quickly grasp the process state by appropriately changing the color reference evaluation value and/or the color upper limit evaluation value. This helps the administrator to be aware of the presence of abnormalities (changes) in the unmeasured factors mentioned above.

[Overall Configuration of Plant Monitoring Device]

Hereinafter, the overall configuration of the plant monitoring system and the functional configuration of the process state analysis device according to the first embodiment of the present invention will be described. In this embodiment, a manufacturing plant is assumed as a monitoring target of the plant monitoring system. However, since the present invention is suitable for being applied to a plant such as a manufacturing plant in which there are many variations or changes in measured values (plant data), it is needless to say that the present invention is also applicable to plants other than the manufacturing plant.

FIG. 3 is a diagram showing an example of the overall configuration of a plant monitoring system 1 and an example of the functional configuration of a process state analysis device 10 according to the first embodiment. The plant monitoring system 1 includes the process state analysis device 10, an input/output device 30, a process result data collecting device 40, and a process data measuring device group 50.

The input/output device 30 is, for example, an input unit having an input device such as a keyboard or a mouse, and is used when an administrator inputs and/or registers data to the process state analysis device 10. The input/output device 30 is an output unit including a display device (display unit) such as a liquid crystal display (LCD) or an organic EL display, and a print output device such as a printer. The input/output device 30 displays an analysis result of the manufacturing plant to be analyzed by the process state analysis device 10 or a screen for interactive processing for the administrator of the process state analysis device 10.

The process result data collecting device 40 is a data server system connected to the process data measuring device group 50 via a network line N. The process result data collecting device 40 acquires the process data transmitted from a plurality of types of measurement devices 51 of the process data measuring device group 50 via a communication I/F 41 and stores it in a process result database 42. The process result database 42 stores the process data in time series. In this specification, the process data stored in the process result database 42 is referred to as "process result data".

Further, the process result data collecting device 40 returns the process result data corresponding to a process result data request via the communication I/F 41 and the network line N. As the process result data collecting device 40, a system generally called Manufacturing Execution System (MES) is commercially available and widely used.

The process data measuring device group 50 is a group of measurement devices 51 arranged on the manufacturing line. Each of the measurement devices 51 has a communication I/F and a data processing unit (not shown), digitizes a measured value read by a sensor installed in a manufacturing facility or an inspection facility or information input by a field worker, and transmits it to the network line N. Further, the measurement device 51 may perform, for example, A/D conversion processing, smoothing processing (noise removal), or normalization processing.

The measurement device 51 may have general-purpose data acquisition, processing, and communication functions. Therefore, in addition to automated equipment such as processing equipment, cleaning equipment, assembly equipment, and inspection equipment, terminal devices such as mobile phone terminals, tablet terminals, and Personal Computer (PC) operated by field workers can be used as the measurement devices 51.

In this way, the process result data stored in the process result database 42 is collected and accumulated by the cooperation of the process data measuring device group 50 and the process result data collecting device 40.

FIG. 4 shows an example of process result data 42D stored in the process result database 42. In the process result data 42D, the "date and time" when the measurement device 51 acquired the measured value, the "measurement item", and the "measured value" ("value" in FIG. 4) are saved in a form linked with an "individual identification number" of the product manufactured on the manufacturing line. A "process identification code" given to each record of the process result data 42D is information for making determination of preprocessing condition and preprocessing more efficient, but is not essential.

The example of FIG. 4 shows a state in which the records of the process result data 42D are arranged in an easy-to-see manner. A storage state of the actual process result data 42D is saved according to the format of the database system. Further, as the database, for example, a relational database in which data is saved in a relational format can be used.

[Process State Analysis Device]

As shown in FIG. 3, the process state analysis device 10 includes, as data processing means, an input/output control unit 11, a data acquisition unit 12, a data preprocessing unit 13, a cluster analysis unit 14, an evaluation value calculation unit 15, and a graph display screen creating unit 16. Further, the process state analysis device 10 includes, as data storage means, a process result data storage unit 18, a cluster condition storage unit 19, and a cluster result data storage unit 20. Further, the process state analysis device 10 includes, as a data interface, a communication I/F 17, and as a user interface, an input/output device 30. These are connected to each other so as to be accessible via an internal bus 25.

The input/output control unit 11 performs a process of receiving data input and/or registered from the input/output device 30. The input/output control unit 11 also transmits image data such as a cluster condition input screen, a cluster result display screen, and a graph display screen to the input/output device 30.

The data acquisition unit 12 acquires the process result data accumulated in the process result database 42 of the process result data collecting device 40 via the network line N and the communication I/F 17, and stores it in the process result data storage unit 18.

The data preprocessing unit 13 accesses the process result data storage unit 18 via the internal bus 25, and from the process result data stored in the process result data storage unit 18, imports data, which becomes an input node of cluster processing by Adaptive Resonance Theory (ART) to be described later, on the basis of the cluster condition of the cluster condition storage unit 19. Then, the data preprocessing unit 13 normalizes the imported data to a value between 0 and 1 so as to be an input node of cluster processing (hereinafter also referred to as "ART processing"). Then, the data preprocessing unit 13 transfers the normalized data to the cluster analysis unit 14 via the internal bus 25.

FIG. 5 shows a state in which the process result data 42D has been preprocessed. The preprocessed process result data 13D is configured by linking the "data identification number" with the "measured value" of each measurement item. In the example of FIG. 5, "component A press-fit pressure" and "component A press-fit distance" are described as measurement items.

The cluster analysis unit 14 receives the cluster condition from the input/output device 30 via the input/output control unit 11, and stores it in the cluster condition storage unit 19. Further, the cluster analysis unit 14 collects data having a close mutual relationship with the process result data on the basis of the cluster condition stored in the cluster condition storage unit 19 and performs clustering for defining a group (cluster). Then, the cluster analysis unit 14 stores the cluster data created by clustering in the cluster result data storage unit 20. As described above, the cluster analysis unit 14 classifies the multi-dimensional measurement data (process data) output from the various measurement devices 51 installed in the manufacturing plant to be monitored, into a plurality of clusters (also called "categories") according to a closeness (similarity) of data mutual relationships according to the cluster condition.

FIG. 6 shows an example of cluster data 20D stored in the cluster result data storage unit 20. In the cluster data 20D, the "cluster number", the "date and time" when the measured value was acquired, and the "final inspection result" for the product are linked by the "data identification number". In the present embodiment, the clusters are identified by numbers (numerals), but characters or symbols may be used as the identification information.

[Clustering]

The outline of clustering using Adaptive Resonance Theory (ART) will be described below. In the clustering of the present embodiment, the cluster result data storage unit 20 stores the cluster data in which the cluster number is obtained according to the similarity from the preprocessed process result data according to the cluster condition. Several methods are known as clustering techniques. In the present embodiment, ART is used among them, but other clustering techniques may be used.

The present invention was invented to complement the weaknesses of unsupervised clustering. However, the present invention works effectively in searching changes in unmeasured factors even for groups (clusters) that have been classified using various pattern classification techniques such as supervised clustering, decision trees, and support vector machines, and in evaluating groups (clusters) by changing the criteria of evaluation values.

(ART)

ART classifies multi-dimensional data into a plurality of clusters on the basis of their similarity. An example of the configuration of ART and a data classification method using ART is described in, for example, Japanese Patent Laid-Open No. 2005-258649. Therefore, a detailed description is omitted here, and only the outline of the data classification method using ART will be described with reference to FIG. 7.

Figure 7:
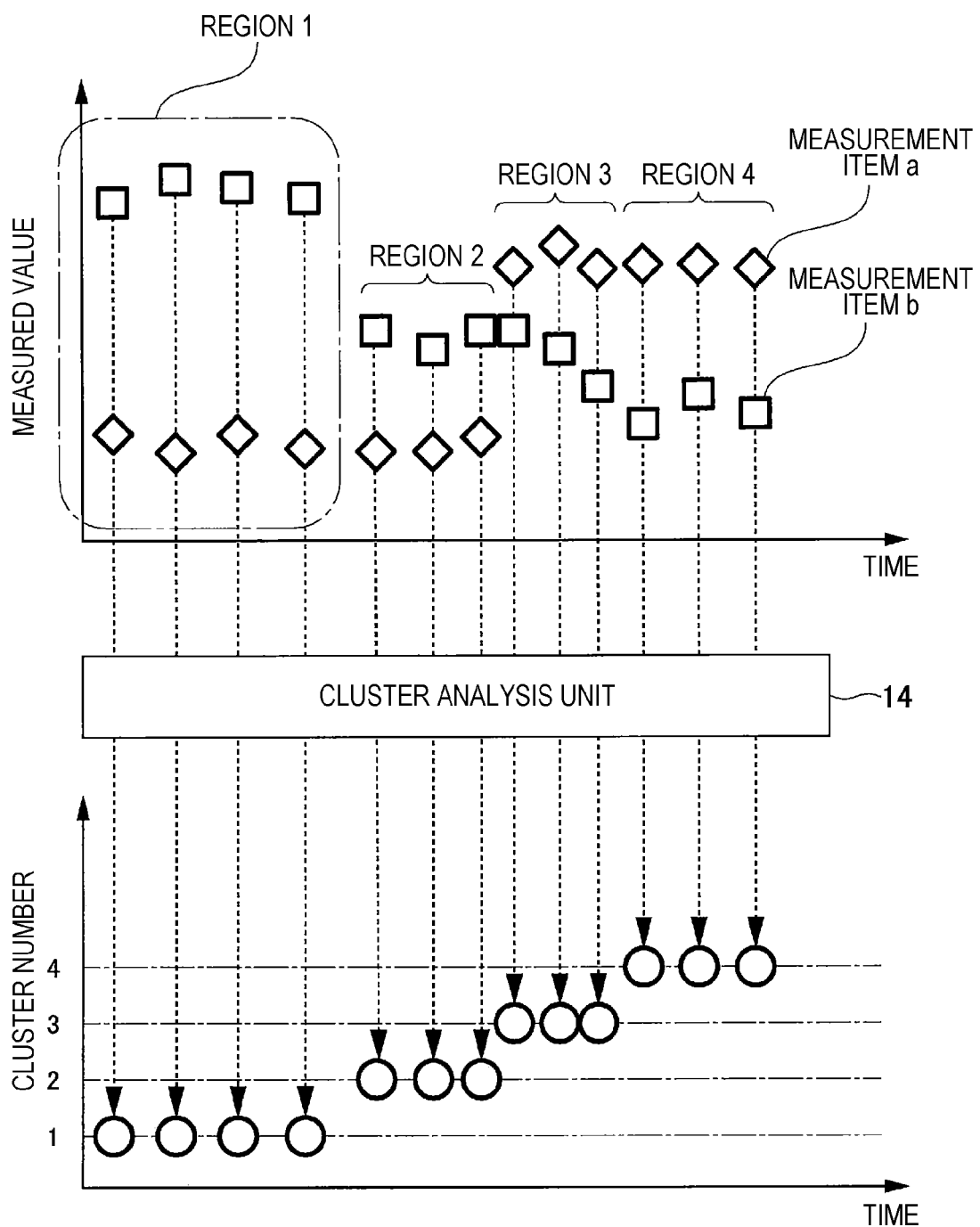
FIG. 7 is a diagram showing an outline of clustering using adaptive resonance theory (ART).

FIG. 7 shows an outline of clustering using Adaptive Resonance Theory (ART). The upper part of FIG. 7 is a graph of preprocessed data, where the horizontal axis represents time and the vertical axis represents the value (measured value) of normalized data.

ART can handle multi-dimensional data. Here, consider a case where data is simplified and two-dimensional data (measurement item a, measurement item b) shown in the upper part of FIG. 7 is classified. When this two-dimensional data is input to the cluster analysis unit 14, for example, the data of a region 1 in which the value of measurement item a is large and the value of measurement item b is small is classified into the same cluster (cluster number "1") (lower part of FIG. 7).

Further, the data of a region 2 is classified into another cluster (cluster number "2") because the relationship (difference) between the measurement item a and the measurement item b is different from the data of the region 1. Similarly, the data of a region 3 and a region 4 are classified into different clusters, respectively. The cluster analysis unit classifies the multi-dimensional preprocessed process result data shown in FIG. 5 by ART.

In ART processing, when data that does not correspond to an existing cluster (category) is input, a new cluster is created and a number is assigned. That is, when the cluster number determined by the cluster analysis unit 14 is different from the already classified cluster number, it is considered that the process result data has changed for some reason.

The evaluation value calculation unit 15 calculates an evaluation value for each cluster for clusters classified based on the distribution of the multi-dimensional process data output from the various measurement devices 51 installed in a plant to be monitored, in the evaluation value calculation range described later.

The graph display screen creating unit 16 (an example of a graph creation unit) determines the hue of the graph element of each cluster, on the basis of the evaluation value of the cluster in the evaluation value calculation range, calculated by the evaluation value calculation unit 15, and the color reference evaluation value which is the evaluation value corresponding to the hue that is the reference of the graph element. Then, the graph display screen creating unit 16 creates and outputs a display screen (graph display screen 601 of FIG. 8 described later) including a graph showing the number of nodes belonging to each cluster for each aggregation unit time in the specified display period. The evaluation value calculation unit 15 and the graph display screen creating unit 16 recalculate the evaluation value at intervals of several seconds according to a specified condition described later, and redraw a graph.

[Processing of Process State Analysis Device]

Next, a procedure of processing performed by the process state analysis device 10 will be described.

Figure 9:
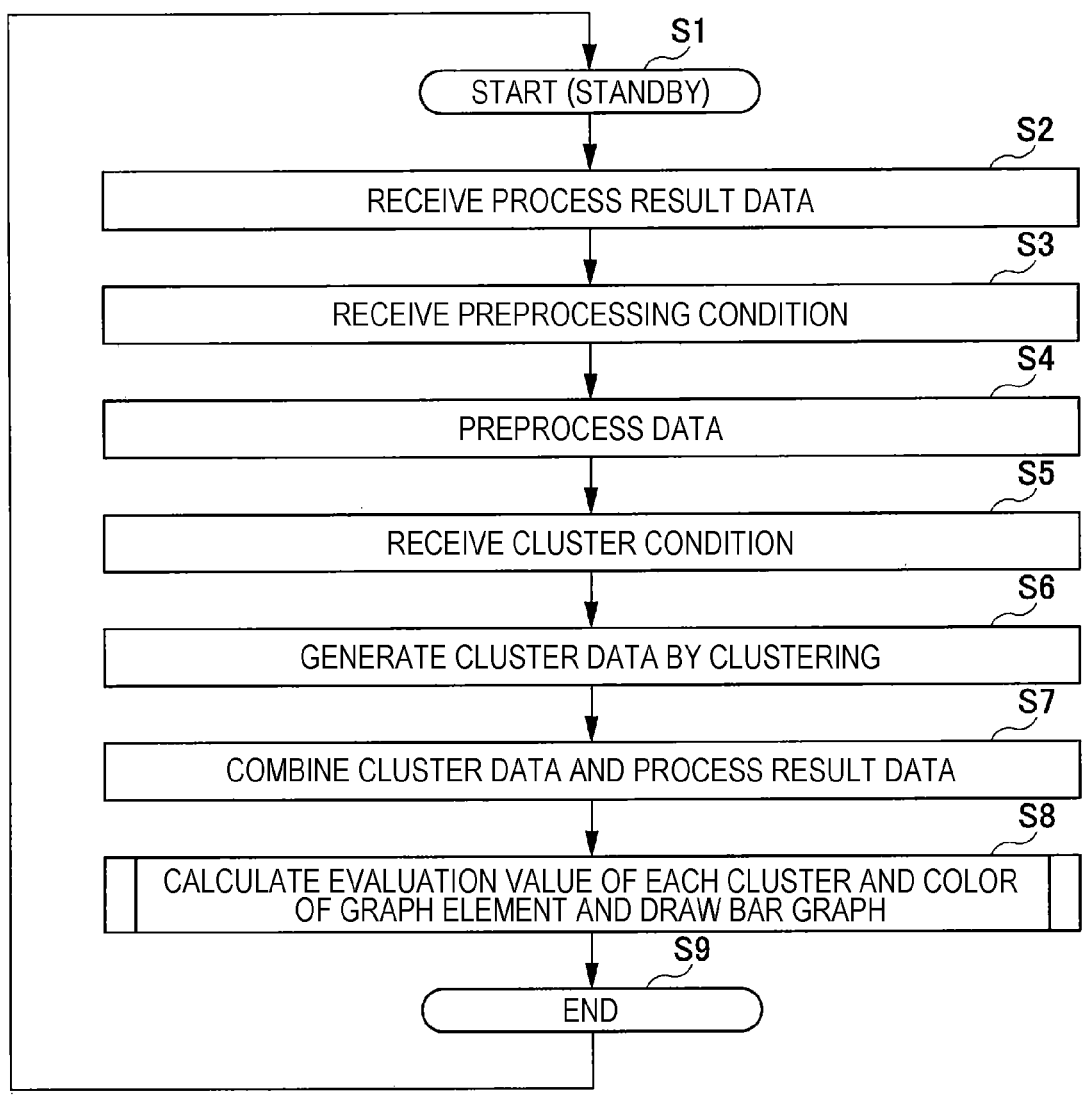
FIG. 9 is a flowchart showing an example of a procedure of processing performed by the process state analysis device.

FIG. 9 is a flowchart showing an example of a procedure of processing performed by the process state analysis device 10. First, when the process state analysis device 10 is in a standby state (S1), upon receiving the analysis start trigger, the process state analysis device 10 proceeds to step S2. After that, the process state analysis device 10 proceeds step by step.

Next, the data acquisition unit 12 acquires the process result data collected by the process result data collecting device 40 and accumulated in the process result database 42 via the network line N and the communication I/F 17, and stores it in the process result data storage unit 18 (S2).

Next, the data preprocessing unit 13 receives the preprocessing condition from the input/output device 30 via the input/output control unit 11 and stores it in the cluster condition storage unit 19 (S3).

Next, the data preprocessing unit 13 reads the process result data stored in the process result data storage unit 18, preprocesses it based on the preprocessing condition stored in the cluster condition storage unit 19, and adds and stores the preprocessed data into the process result data storage unit 18 (S4).

Here, the procedure of data preprocessing by the data preprocessing unit 13 in step S4 will be described. The data preprocessing is performed according to the following procedure. First, the data preprocessing unit 13 assigns data identification numbers (see FIG. 5) to the process result data. Then, the data preprocessing unit 13 uniquely links the process result data to which the data identification numbers are assigned with the individual identification numbers (see FIG. 4), and arranges them in order of oldest date and time. At this time, since one product individual passes through a plurality of processes, there are a plurality of dates and times linked with individual identification numbers. Therefore, the date and time used for rearrangement is unified to the passage date and time of one process determined in advance from among a plurality of processes.

Next, the data preprocessing unit 13, for the process result data, normalizes the measured values so that the measured values are distributed in the range of 0 to 1 for each measurement item. Character data items such as measurement items are excluded. In addition, when the measured values after normalization overlap, the data with the newest date and time remain and other data are excluded. In addition, the data preprocessing unit 13 performs data extraction and calculation on the basis of the preprocessing conditions (not shown) preliminarily input by the administrator from the input/output device 30 and stored in the cluster condition storage unit 19.

The information on the preprocessing conditions used in the present embodiment includes a time-series range of process result data to be clustered, measurement items to be clustered, and normalization upper and lower limit values of each measurement item.

Returning to the description of the flowchart in FIG. 9. After the processing of step S4, the cluster analysis unit 14 receives the cluster condition from the input/output device 30 via the input/output control unit 11 and stores it in the cluster condition storage unit 19 (S5).

Next, the cluster analysis unit 14 creates cluster data by clustering the preprocessed process result data on the basis of the cluster condition stored in the cluster condition storage unit 19, and stores the cluster data in the cluster result data storage unit 20 (S6).

Next, the cluster analysis unit 14 combines the cluster data stored in the cluster result data storage unit 20 and the preprocessed process result data, and adds and stores them to the cluster result data storage unit 20 (S7).

Then, the process state analysis device 10, based on the evaluation value condition of a predetermined initial value (evaluation value calculation range, aggregation unit time, etc.) and color conditions (color reference evaluation value, color upper limit evaluation value, etc.), calculates the evaluation value of the cluster and the color of the graph element, and creates a graph display screen (S8). Here, the evaluation value calculation unit 15 and the graph display screen creating unit 16 calculate the evaluation value of the cluster and the color of the graph element to create the graph display screen on the basis of the cluster data and the evaluation value condition and the color condition acquired from the input/output device 30 via the input/output control unit 11. Details of the processing in step S8 will be described later.

After the processing of step S8, the process state analysis device 10 ends the processing (S9) and returns to the standby state (S1). The input/output control unit 11 outputs the image data of the graph display screen created by the graph display screen creating unit 16 to the input/output device 30. As a result, the graph display screen is displayed on the input/output device 30.

[Graph Display Screen]

Here, the graph display screen created by the graph display screen creating unit 16 will be described.

Figure 8:
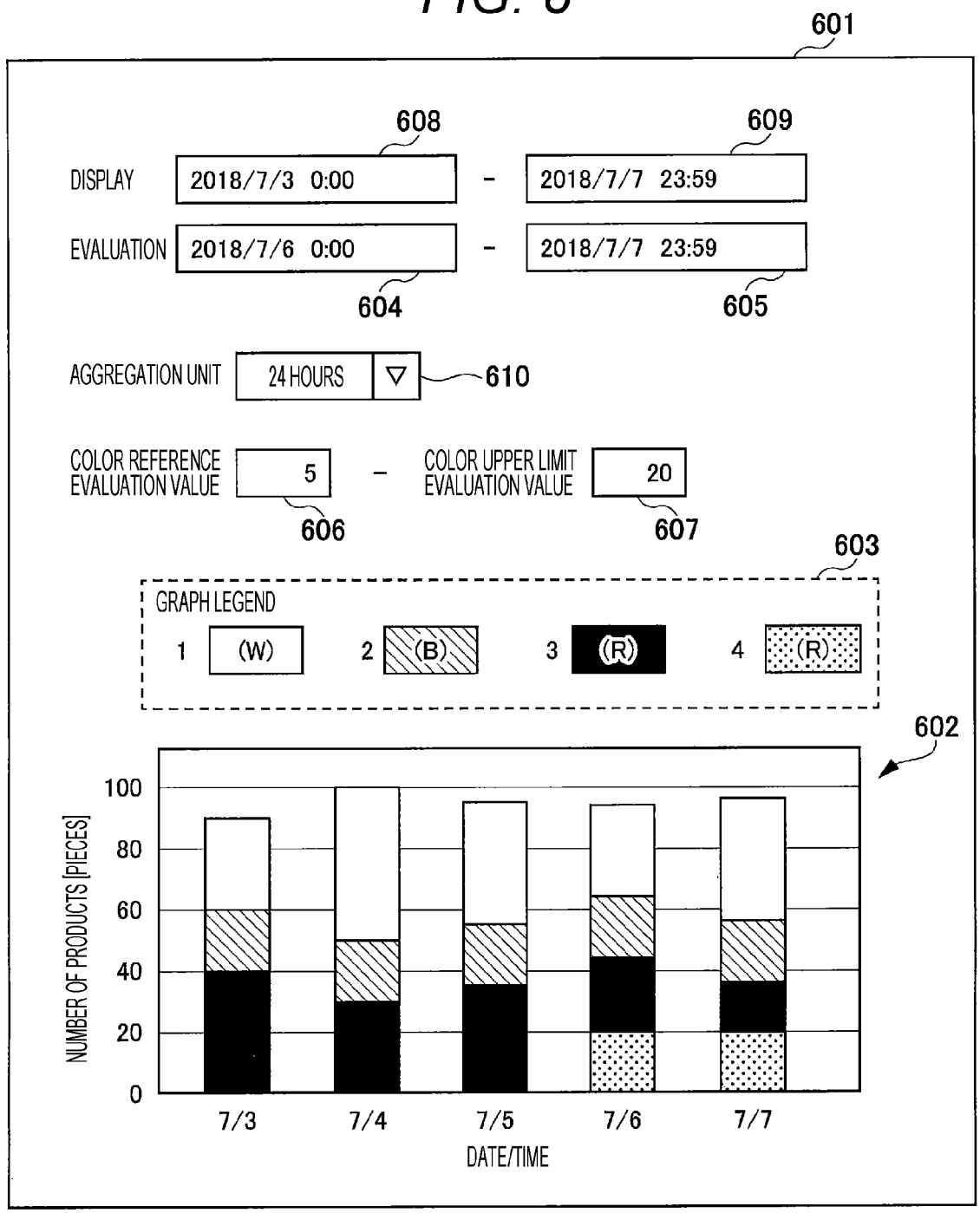
FIG. 8 is a diagram showing an example of a graph display screen (stacked bar graph) created by a graph display screen creating unit.

FIG. 8 shows an example of the graph display screen 601 created by the graph display screen creating unit 16. On the graph display screen 601, an evaluation start date/time input frame 604, an evaluation end date/time input frame 605, a color reference evaluation value input frame 606, a color upper limit evaluation value input frame 607, a graph 602, and a graph legend 603 are arranged. Furthermore, on the graph display screen 601, an aggregation unit time input frame 610, a graph display start date/time input frame 608, and a graph display end date/time input frame 609 are arranged. Before the administrator inputs a value, a predetermined initial value is input in each of the input frames 604 to 610.

The evaluation start date/time input frame 604 is an input field for the administrator to operate the input/output device 30 to specify the date and time to start the evaluation of the cluster. The evaluation end date/time input frame 605 is an input field for specifying the date and time when the evaluation of the cluster ends. In this embodiment, the evaluation value calculation range is a period set by the evaluation start date and time and the evaluation end date and time. The evaluation value calculation range is, for a classified cluster, a target period for calculating the evaluation value of the cluster. The evaluation value calculation unit 15 calculates an evaluation value for each cluster in the evaluation value calculation range.

The color reference evaluation value input frame 606 is an input field for the administrator to operate the input/output device 30 to specify an evaluation value (color reference evaluation value) corresponding to the hue that is the reference of the graph element. The color upper limit evaluation value input frame 607 is an input field for specifying an upper limit evaluation value (hereinafter, referred to as "color upper limit evaluation value") that maximizes the second color (for example, red) component. Here, the color upper limit evaluation value input frame 607 is given as an example, but instead of the color upper limit evaluation value input frame 607 or in addition to the color upper limit evaluation value input frame 607, an input field may be provided for specifying a lower limit evaluation value (hereinafter, referred to as "color lower limit evaluation value") that maximizes the first color (for example, blue) component. The color upper limit evaluation value and the color lower limit evaluation value are examples of the color boundary evaluation value.

As described above, in this embodiment, in order to determine the hue of the graph element, an input frame is provided for the administrator to input the color reference evaluation value and the color upper limit evaluation value. Then, it is configured such that the color of the graph element corresponding to the color reference evaluation value (color-coding reference value) is white, and the first color (blue) component increases as the evaluation value becomes lower than the color reference evaluation value. Further, it is configured such that as the evaluation value becomes higher than the color reference evaluation value, the second color (red) component is increased, and when the evaluation value is equal to (including substantially the same case) or exceeds the color upper limit evaluation value, the second color (red) component is maximized.

The aggregation unit time input frame 610 is an input field for the administrator to operate the input/output device 30 to specify the time as a unit for aggregating the process result data.

The graph display start date/time input frame 608 and the graph display end date/time input frame 609 are for specifying the graph display period. The graph display start date/time input frame 608 is an input field for the administrator to operate the input/output device 30 to specify the date and time to start graph display. The graph display end date/time input frame 609 is an input field for specifying the date and time to end graph display.

In the graph 602, a graph showing the process state is displayed. In the example of FIG. 8, as the graph 602, a time-series (chronological order) stacked bar graph is displayed. The horizontal axis of the graph 602 represents the date and time, and the vertical axis represents the number of products [pieces]. The graph legend 603 shows the correspondence between cluster numbers and hues. The hue is determined according to the evaluation value of the cluster, the color reference evaluation value, and the color upper limit evaluation value. (B) and (R) in the figure show that the tints of the graph elements are blue and red, respectively, and (W) shows white. These characters are not displayed on the actual graph display screen.

In the example of FIG. 8, the evaluation value of Cluster 3 is equal to or exceeds the color upper limit evaluation value "20", indicating that the red of the graph element of Cluster 3 is darker than the red of Cluster 4. The details of the data processing will be described below.

[Processing of Evaluation Value Calculation Unit and Graph Display Screen Creating Unit]

Figure 10:
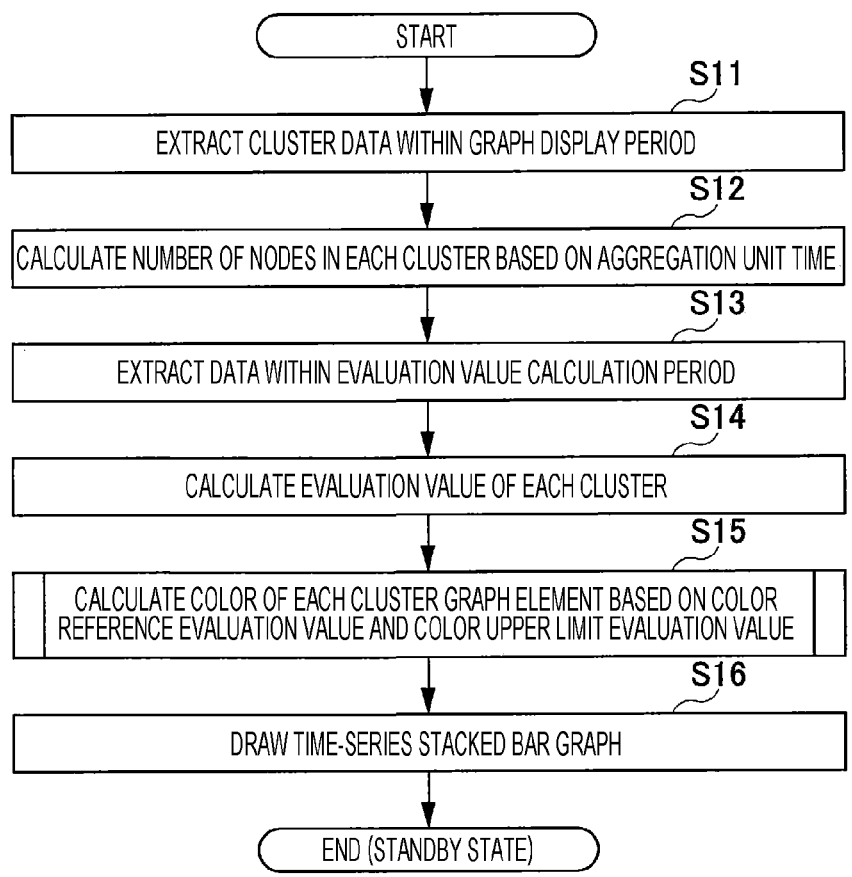
FIG. 10 is a flowchart showing details of processing by an evaluation value calculation unit and a graph display screen creating unit.

Next, details of the processing by the evaluation value calculation unit 15 and the graph display screen creating unit 16 in step S8 will be described. FIG. 10 is a flowchart showing a detailed procedure example of processing by the evaluation value calculation unit 15 and the graph display screen creating unit 16 in step S8.

(Evaluation Value Calculation)

First, the evaluation value calculation unit 15 extracts the cluster data within the graph display period from the cluster result data storage unit 20 on the basis of the graph display start date and time and the graph display end date and time input in the graph display start date/time input frame 608 and the graph display end date/time input frame 609 of the graph display screen 601 (see FIG. 8) (S11).

Next, the evaluation value calculation unit 15 calculates the number of nodes (products in this embodiment) belonging to each cluster for each aggregation unit time input in the aggregation unit time input frame 610 (S12).

Next, the evaluation value calculation unit 15 extracts the cluster data within the evaluation value calculation period (evaluation value calculation range) on the basis of the evaluation start date and time and the evaluation end date and time input in the evaluation start date/time input frame 604 and the evaluation end date/time input frame 605 (S13).

Next, the evaluation value calculation unit 15 calculates the evaluation value of each cluster on the basis of the values of the measurement items specified in advance for the extracted cluster data (S14). In this embodiment, the value of "final inspection result" is used as the measurement item.

Next, the graph display screen creating unit 16 calculates the hue of the graph element of each cluster on the basis of the cluster data, the color reference evaluation value input in the color reference evaluation value input frame 606, and the color upper limit evaluation value input in the color upper limit evaluation value input frame 607 (S15).

Finally, the graph display screen creating unit 16 draws a bar graph in which the number of clusters for each aggregation unit time is accumulated with the date and time (graph display period) as the horizontal axis (S16). The hue of the graph element of each cluster is the hue calculated in step S15. After the processing of step S16, the process state analysis device 10 shifts to the standby state (S1 in FIG. 9).

(Calculation of Hue of Graph Element)

Figure 11:
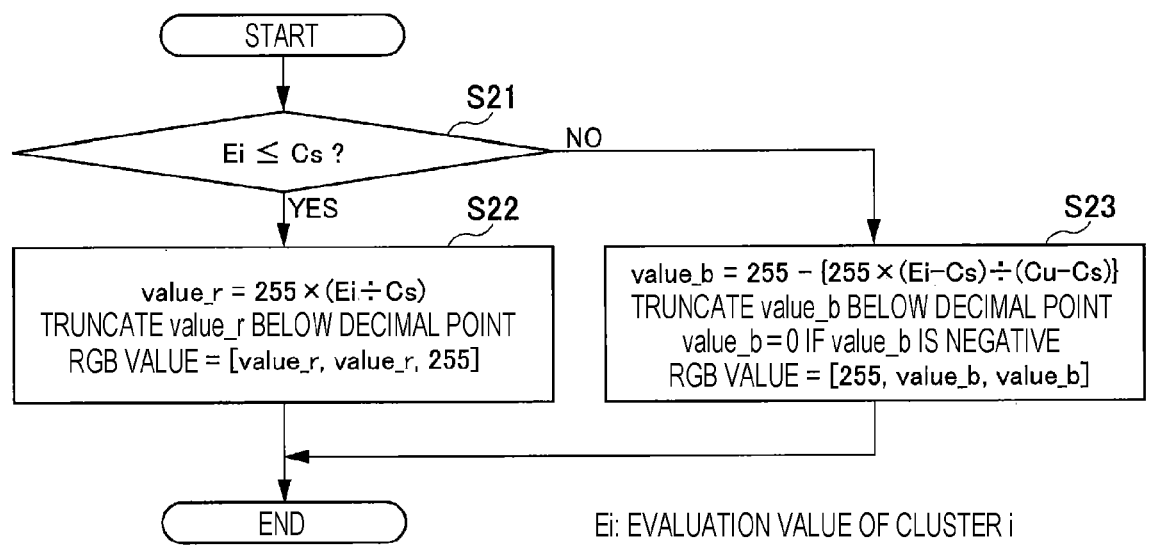
FIG. 11 is a flowchart showing a hue calculation process of a graph element of each cluster, which is performed by the graph display screen creating unit.

Next, details of the processing by the graph display screen creating unit 16 in step S15 will be described. FIG. 11 is a flowchart showing the calculation process of the hue of the graph element of each cluster in step S15, which is performed by the graph display screen creating unit 16.

First, the graph display screen creating unit 16 determines whether an evaluation value Ei of Cluster i is less than or equal to the color reference evaluation value (S21). Then, the graph display screen creating unit 16, when determining that the evaluation value Ei is less than or equal to the color reference evaluation value (YES in S21), proceeds to step S22, and when determining that the evaluation value Ei exceeds the color reference evaluation value (NO in S21), proceeds to step S23.

When the evaluation value Ei is less than or equal to the color reference evaluation value (YES in S21), the graph display screen creating unit 16 determines an RGB value of the graph element by the following formula in the RGB value that defines the color with the three primary colors (S22). Here, Ei is the evaluation value of Cluster i, Cs is the color reference evaluation value, and Cu is the color upper limit evaluation value. If the calculation result of the R value includes a decimal point, the part below the decimal point is truncated.

R value=255×(Ei÷Cs)
G value=R value
B value=255

On the other hand, when the evaluation value Ei exceeds the color reference evaluation value (NO in S21), the graph display screen creating unit 16 obtains the RGB value of the graph element by the following formula (S23). If the calculation result of the B value includes a decimal point, the part below the decimal point is truncated. When the calculation result of the B value is negative, the B value=0.

R value=255
G value=B value
B value=255−{255×(Ei−Cs)÷(Cu−Cs)}

The graph display screen creating unit 16 sets the RGB value thus obtained as the hue of the graph element of Cluster i. After the processing of step S22 or the processing of step S23, the graph display screen creating unit 16 creates a stacked bar graph on the basis of the calculated RGB values of the graph elements of Cluster i, and the graph 602 (see FIG. 8) is displayed on the graph display screen 601 (S16 in FIG. 10).

As can be understood from the above formula, the hue of the graph element of the cluster is determined by the magnitude relationship and a magnitude of the difference between the cluster evaluation value based on the input value in the evaluation value calculation range and the color reference evaluation value. The directionality of the hue (blue or red in this embodiment) is determined by the magnitude relationship, and the value of the specific color component is determined by the magnitude of the difference. When the color boundary evaluation value (for example, the color upper limit evaluation value in FIG. 8) is set, the graph display screen creating unit 16 determines a hue of the graph element of the cluster in which the magnitude of the difference between the evaluation value of the cluster and the color reference evaluation value exceeds the magnitude of the difference between the color boundary evaluation value and the color reference evaluation value as the same hue as the hue corresponding to the color boundary evaluation value.

In the present embodiment, the evaluation value calculation unit 15 calculates the evaluation value for Cluster i within the evaluation value calculation range, and the graph display screen creating unit 16 determines the hue of the graph elements of Cluster i on the basis of the evaluation value, the color reference evaluation value, and the color boundary evaluation value. Then, the graph display screen creating unit 16 assigns the same hue of the graph element as that in the evaluation value calculation range to Cluster i having the same number outside the evaluation value calculation range. For example, in the graph display screen 601 of FIG. 8, the evaluation values and the hues of the graph elements calculated for Clusters 1 to 4 on July 6 and July 7 are applied also to Clusters 1 to 3 from July 3 to July 5 and the graph 602 is displayed.

When the evaluation value calculation range is changed, the evaluation value calculation unit 15 recalculates the evaluation value for each cluster in the changed evaluation value calculation range. Then, the graph display screen creating unit 16 uses the evaluation value recalculated for each cluster within the evaluation value calculation range to recreate and redraw a graph that represents the number of nodes in each cluster for each aggregation unit time in the specified graph display period.

Further, the graph display screen creating unit 16, when the color reference evaluation value is changed, determines the hue of the graph element of each cluster on the basis of the evaluation value of the cluster in the evaluation value calculation range, and the changed color reference evaluation value. Then, the graph display screen creating unit 16 recreates and redraws a graph representing the number of nodes in each cluster for each aggregation unit time in the specified graph display period.

When both the evaluation value calculation range and the color reference evaluation value are changed, the evaluation value calculation unit 15 and the graph display screen creating unit 16 respectively perform the above processing to recreate and redraw the graph.

In the first embodiment configured as described above, targeting the manufacturing line of the manufacturing plant where there are many variations and changes in the measured values, the quality (defective rate) of the product state as the process state is discriminated by the color of the cluster on the basis of the evaluation value calculation range specified by the administrator. Thereby, in the first embodiment, the appearance, increase/decrease, disappearance, etc. of clusters can be visualized. Therefore, the administrator can intuitively recognize the process state and can appropriately grasp the process state. As described above, according to the first embodiment, it is possible to assist the administrator in quickly estimating the cause of defect and the sign of defect, and prevent misjudgment of the process state.

Further, according to the first embodiment, by changing the evaluation value calculation range and displaying the transition of the evaluation value of each cluster in a graph, it is possible to assist the administrator in estimating the existence of an unmeasured factor that affects the evaluation value that has occurred at a specific time and to contribute to maintaining the quality of the product.

The application of the first embodiment is not limited to real-time process state analysis. Since the first embodiment can change the graph display period and/or the evaluation value calculation range to display the evaluation value transition of each cluster in a graph, it can be used for analysis work and case studies at a later date.

In the first embodiment, a stacked bar graph is drawn as the graph 602 on the graph display screen 601, but the type of graph may be another type such as a polygonal line or a histogram. Below, the example of another graph is described.

[First Modification of First Embodiment]

A case where a polygonal line graph is used as a first modification of the first embodiment will be described.

Figure 12:
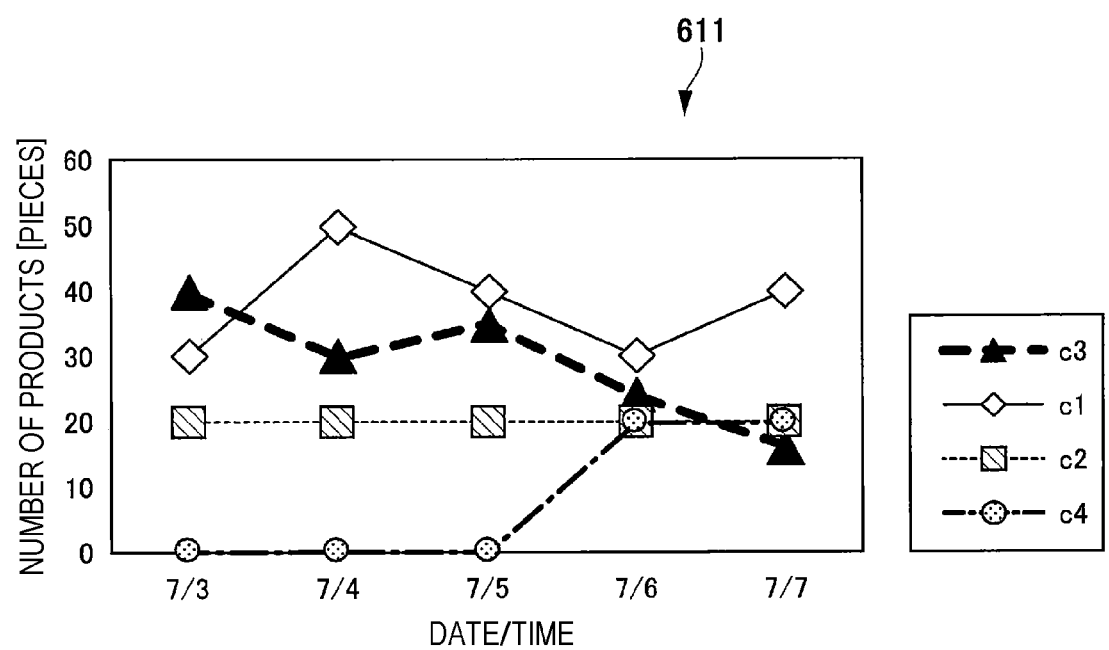
FIG. 12 is a diagram showing an example of a graph (polygonal line graph) according to a first modification of the first embodiment.

FIG. 12 shows an example of a graph according to the first modification of the first embodiment. FIG. 12 is an example in which the same information is displayed as a polygonal line graph 611 instead of the graph 602 using the stacked bar graph shown in FIG. 8. The horizontal axis represents the date and time, and the vertical axis represents the number of products [pieces]. The color of the figure arranged at each plot point and the line segment connecting the figures of the polygonal line graph 611 is based on the evaluation value (defective rate) of the corresponding cluster, and is the same as the color shown in the graph legend 603 of FIG. 8.

In the example of FIG. 12, it can be seen that products belonging to Cluster c4 have appeared since July 6, and the number of products in Cluster c3 has decreased on July 6 and July 7 compared to the previous day. By displaying the polygonal line graph 611 in this way, it is easy to see the increase or decrease in the number of products (number of nodes) belonging to each cluster.

[Second Modification of First Embodiment]

As a second modification of the first embodiment, a case of using a histogram will be described.

Figure 13:
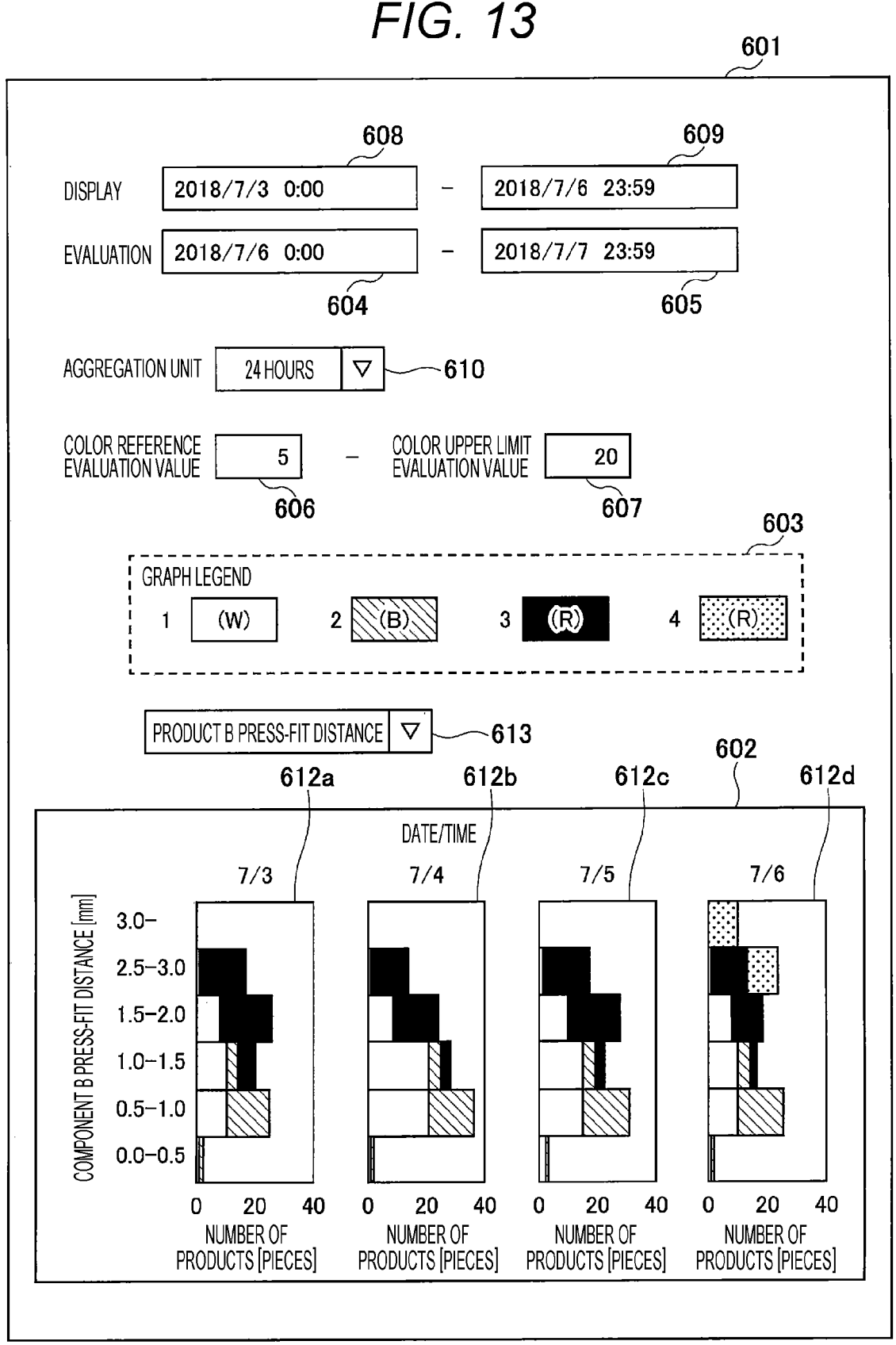
FIG. 13 is a diagram showing an example of a graph display screen (histogram) according to a second modification of the first embodiment.

FIG. 13 shows an example of a graph display screen 601 according to the second modification of the first embodiment. FIG. 13 is an example in which histograms 612a to 612d are displayed by adding the information of the distribution of the measured values to the graph 602 which is the time-series stacked bar graph shown in FIG. 8.

When the graph 602 including histograms is displayed, the measured values are aggregated based on the input values of the graph display start date/time input frame 608, the graph display end date/time input frame 609, and the aggregation unit time input frame 610, and the histograms 612a to 612d are created for each aggregation unit time and arranged in time series (by date and time). Hereinafter, when the histograms 612a to 612d are not distinguished, they will be referred to as a histogram 612.

The cluster analysis unit 14 uses the individual identification number as a key to combine the cluster data shown in FIG. 6 with the preprocessed process result data shown in FIG. 5 to acquire the measured value (value of measurement item). The type of measured value displayed in the graph follows the input value of an item selection frame 613 set in the graph display screen 601. In the example of FIG. 13, the number of products belonging to the cluster is shown as a breakdown (item of frequency) of the histogram 612. The color of the graph element of the histogram 612 is based on the evaluation value of the corresponding cluster and is the same as the color shown in the graph legend 603.

In this way, by displaying the process state change by the graph 602 using the histogram 612 to which the information of the distribution of the measured values is added, it is easy to grasp how the number of products in each cluster increases or decreases as the distribution of the measured values gradually changes.

Second Embodiment

Next, the graph display according to the second embodiment of the present invention will be described.

In the first embodiment, if the cluster numbers are the same, the same color is assigned to the graph elements of the corresponding cluster because the same color is based on the same evaluation value even when the dates and times for displaying the clusters are different. On the other hand, in the second embodiment, the evaluation value is calculated for each aggregation unit time input in the aggregation unit time input frame 610. Therefore, even if the cluster numbers are the same, the clusters may be displayed in different colors if the dates and times for displaying the clusters in the graph are different.

In the second embodiment, in the flowchart showing the processing of the evaluation value calculation unit 15 and the graph display screen creating unit 16 of FIG. 10, the evaluation value calculation range acquired in step S13 is the same as the aggregation unit time used in step S12.

Figure 14:
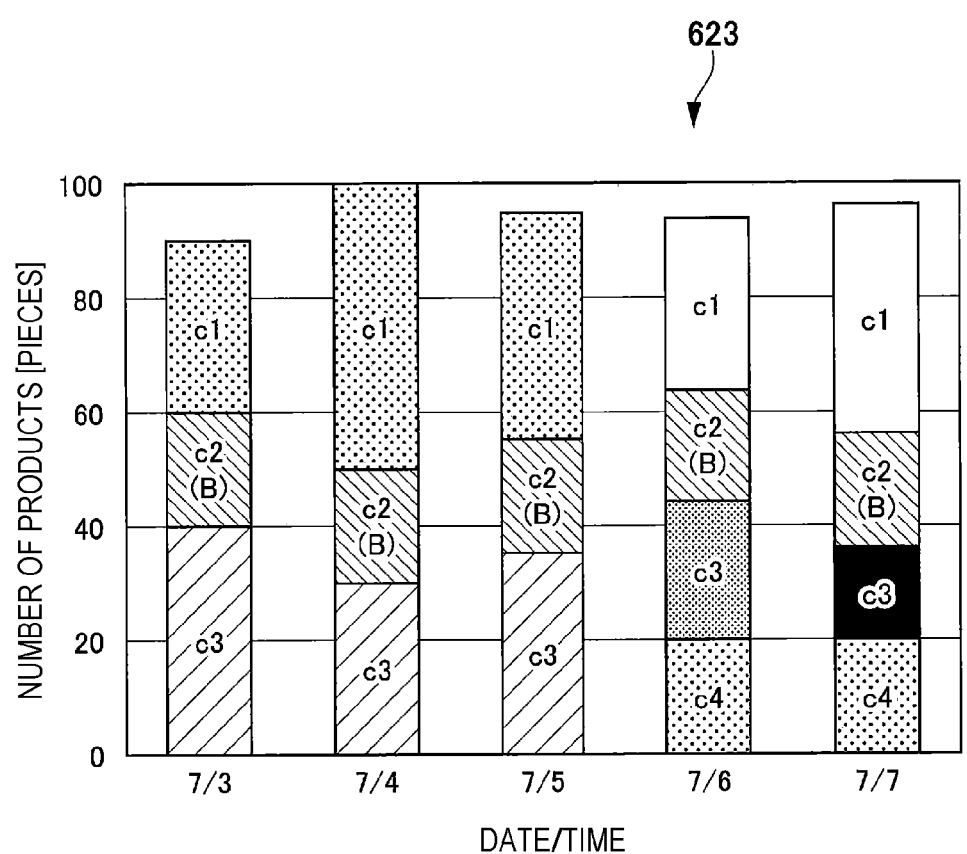
FIG. 14 is a diagram showing an example of a graph (stacked bar graph) according to a second embodiment.

FIG. 14 shows an example of a graph according to the second embodiment. FIG. 14 is an example of a stacked bar graph 623 created by the evaluation value calculation unit 15 and the graph display screen creating unit 16. In the stacked bar graph 623, clusters of graph elements are indistinguishable only by colors, and thus cluster numbers are displayed for each graph element. (B) in the figure indicates that the graph element is blue. The shaded pattern represents a shade having more blue components than red, and the dot pattern and the filled pattern represent shades having more red components than blue. The narrower the distance between lines and dots are, and the darker the shade, the darker the color. It should be noted that the filled pattern is darker in color than the dot pattern (in FIG. 14, red is stronger). In the example of FIG. 14, the aggregation unit time is "24 hours".

According to the second embodiment described above, even in the same cluster, that is, in an individual group (group of products) having similar measured value distributions, it is easy to find a location where the evaluation value differs depending on the time. For example, in the example of FIG. 14, the following possibilities are suggested. Therefore, the environment may have changed in the manufacturing line, and it is thought that the situation should be investigated.

In FIG. 14, from July 6 to July 7, the evaluation value of Cluster c1 decreased (changed from light red to white) than before (July 3 to July 5), while the evaluation value of Cluster c3 increased (changed from light blue before July 5 to slightly dark red and dark red). With such a graph display, the administrator can notice the possibility that there is an unmeasured factor that affects the evaluation value.

Further, since the evaluation value of Cluster c2 does not change, Cluster c2 is not affected by the environmental change. It is also shown that the above unmeasured factor affects Clusters c1 and c3 but not Cluster c2.

Furthermore, since Cluster c4 appeared from July 6 to July 7, there may be a possibility that the process (manufacturing process), materials, etc. changed.

As described above, the second embodiment can provide the administrator with a clue to infer the existence of an unmeasured factor that affects the evaluation value and what the unmeasured factor is.

Figure 15:
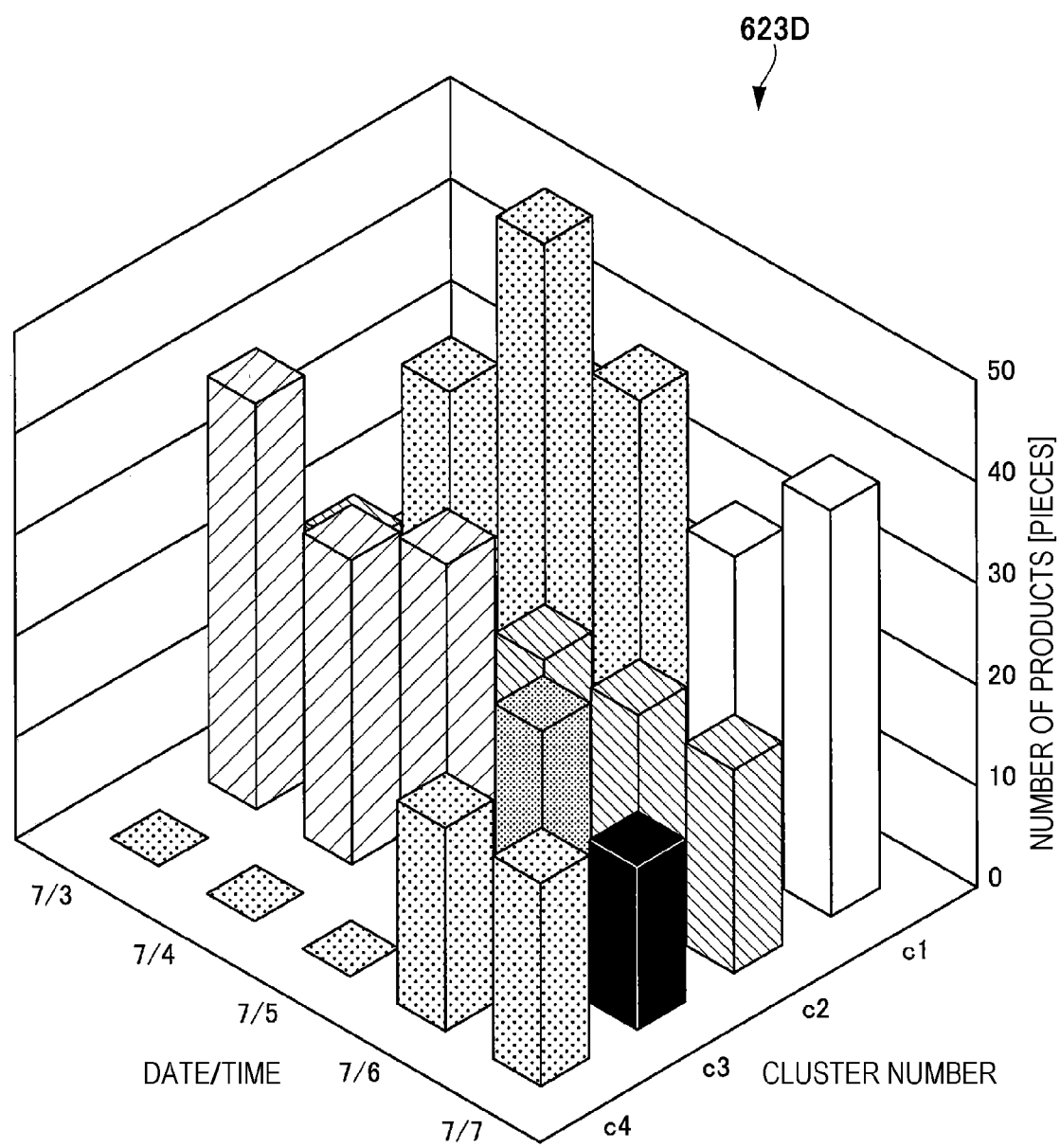
FIG. 15 is a diagram showing another example of the graph (stacked bar graph) according to the second embodiment.

FIG. 15 shows another example of the graph according to the second embodiment. FIG. 15 shows the same information as a three-dimensional graph 623D instead of the two-dimensional stacked bar graph 623 shown in FIG. 14.

In FIG. 15, the "date and time" and the "cluster number" are shown on the two-dimensional plane consisting of the first axis and the second axis, and the "number of products" is shown on the third axis orthogonal to the two-dimensional plane. According to this graph display method, the distribution of clusters can be easily seen, and the transition of the number of products belonging to each cluster of Clusters c1 to c4 can be easily compared.

[First Modification of Second Embodiment]

Figure 16:
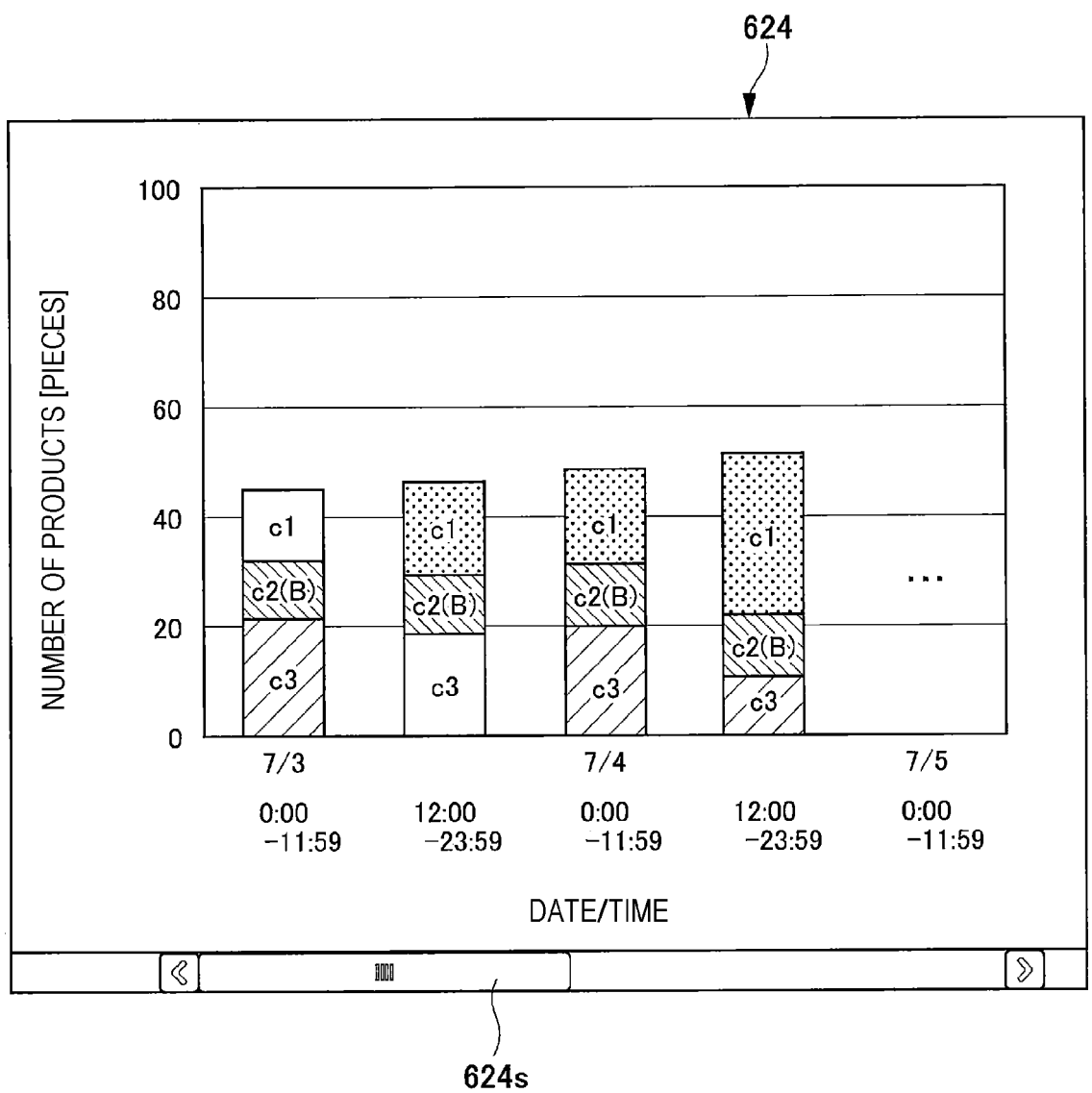
FIG. 16 is a diagram showing an example of a graph (stacked bar graph) according to a first modification of the second embodiment.

FIG. 16 shows an example of a graph according to the first modification of the second embodiment. In the example of FIG. 16, the same information as that in the case of the graph of FIG. 14 is displayed as a graph with the aggregation unit time being "12 hours". In this case, as shown in FIG. 16, the first stacked bar graph for the time zone of "0:00-11:59" in the day is created, and the second stacked bar graph for the time zone of "12:00-23:59" is created. In addition, in FIG. 16, the display of the stacked bar graph of "0:00-11:59" on July 5 is omitted.

According to the stacked bar graph 624 in FIG. 16, in the second half time zone (12:00-23:59) on July 3, in comparison with the first half time zone (0:00-11:59) on July 3, it can be confirmed that the evaluation value of Cluster c1 increased (changed from white to light red) and the evaluation value of Cluster c3 decreased (changed from light blue to white). On the other hand, it can be seen that the number of products in Clusters c1 and c3 changed significantly during the second half time zone (12:00-23:59) on July 4.

Here, if the aggregation unit time is set to a short time, it can be considered that the stacked bar graphs of all the dates and times included in the specified graph display period cannot be displayed in the graph display screen. In that case, the administrator operates the input/output device 30 to laterally move a slide bar 624s arranged below the stacked bar graph 624. As a result, the graph display screen creating unit 16 performs a process of displaying the stacked bar graph within the graph display period while scrolling horizontally. The horizontal direction is a direction parallel to the axis representing the date and time. For example, in the example of FIG. 16, by operating the slide bar 624s to the right, the contents of the stacked bar graph 624 scrolls to the left, and the stacked bar graphs after "12:00-23:59" on July 5 are displayed.

With such a graph display, the administrator can grasp the transitions in the number of products and evaluation values of each cluster in detail for each aggregation unit time.

[Second Modification of Second Embodiment]

Figure 17:
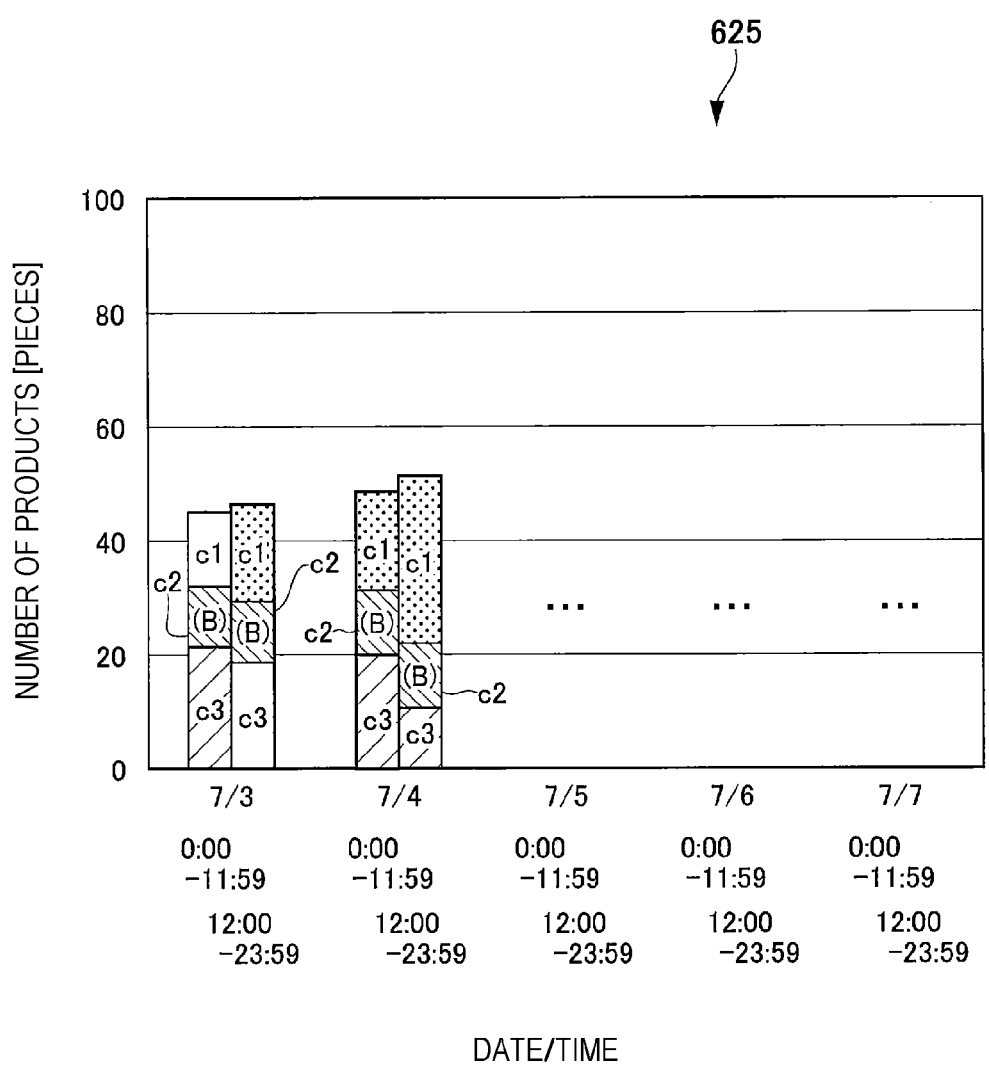
FIG. 17 is a diagram showing an example of a graph (stacked bar graph) according to a second modification of the second embodiment.

FIG. 17 shows an example of a graph according to a second modification of the second embodiment. Similar to FIG. 16, in the example of FIG. 17, the same information as that in the case of the graph of FIG. 14 is displayed as a graph, with the aggregation unit time being "12 hours". However, in the stacked bar graph 625 in FIG. 17, the stacked bar graphs for two time zones "0:00-11:59" and "12:00-23:59" are adjacent to each other in the display area for one day.

In this way, by displaying the stacked bar graphs adjacent to each other for each aggregation unit time in the display area for one day, it becomes easy for the administrator to intuitively grasp the transition of the evaluation value of each cluster during one day.

By inputting an arbitrary time in the aggregation unit time input frame 610, it is possible to finely set the aggregation unit time such as "6 hours". When the aggregation unit time is set to "6 hours", it is possible to draw four stacked bar graphs per day if the plant operates for 24 hours. The graph display screen creating unit 16 may draw an arbitrary number of stacked bar graphs from among the four. For example, a function (GUI element) that allows the administrator to select an arbitrary time zone from the time zones obtained by dividing 24 hours into four is prepared in the graph display screen, and the graph display screen creating unit 16 displays a stacked bar graph of the time zone (number) selected by the administrator. As a result, the administrator can centrally monitor the change in the process state by narrowing down the time zone that requires attention.

Third Embodiment

Next, the third embodiment of the present invention will be described. The third embodiment has a configuration in which the evaluation start date/time input frame 604 and the evaluation end date/time input frame 605 are not arranged on the graph display screen 601 as compared with the first and second embodiments.

The evaluation value calculation unit 15 and the graph display screen creating unit 16 update the evaluation start date and time and the evaluation end date and time to a preset value for each preset time, and recalculate the evaluation value and the color of the graph element and redraw the graph. For example, as the initial value, the graph display period is set to one week, and the evaluation value calculation range is set to the latest two days. These set values are stored in, for example, a ROM 72 or a non-volatile storage 77 described later.

According to the third embodiment described above, it is possible to save the administrator from having to input the evaluation start date and time and the evaluation end date and time. Since the administrator may look at the graph display screen and check the details by stopping the updating of the graph particularly only when the dark state of the graph color appears, the process state can be easily monitored.

Fourth Embodiment

Next, the fourth embodiment of the present invention will be described. In the fourth embodiment, an unknown factor search unit is further added to the process state analysis device 10 shown in FIG. 3.

Figure 18:
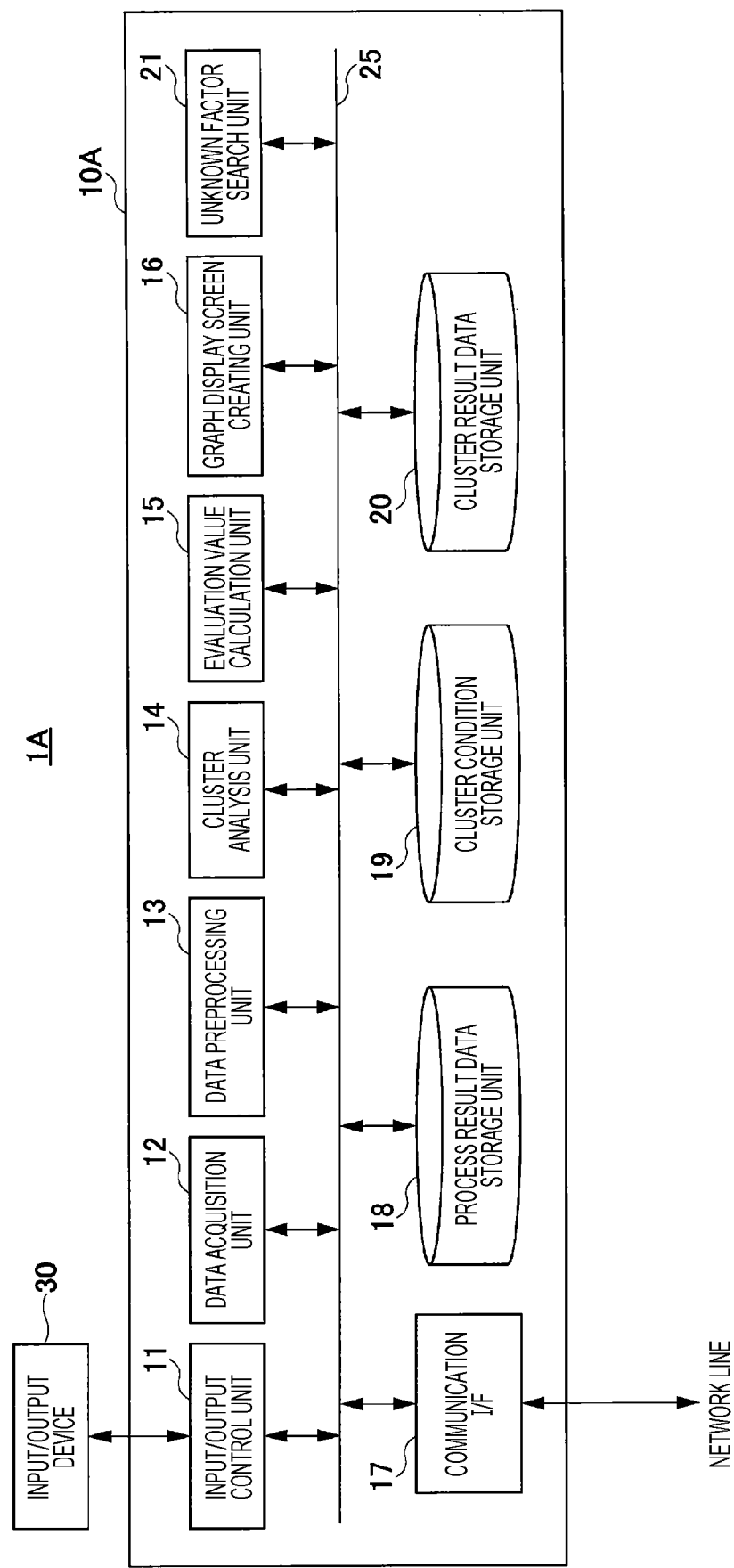
FIG. 18 is a diagram showing a functional configuration example of a process state analysis device according to a fourth embodiment.

FIG. 18 shows a functional configuration example of a process state analysis device 10A of a plant analysis system 1A according to the fourth embodiment. An unknown factor search unit 21 can be configured by a search-type machine learning program (including artificial intelligence). The unknown factor search unit 21 targets the cluster data stored in the cluster result data storage unit 20 with an objective variable as an evaluation value (for example, a defective rate), and with an explanatory variable as an evaluation start date and time, an evaluation end date and time, and a cluster number, and performs machine learning. Then, the unknown factor search unit 21 repeatedly calculates the evaluation value while gradually changing the explanatory variable in the direction in which the objective variable moves toward the optimal solution, and thus extracts the combination of the evaluation value calculation period and the cluster number that maximizes the evaluation value.

Then, the graph display screen creating unit 16 displays the evaluation start date and time and the evaluation end date and time extracted by the unknown factor search unit 21 in the evaluation start date/time input frame 604 and the evaluation end date/time input frame 605. Further, the graph display screen creating unit 16 sets and displays the extracted maximum evaluation value as the initial value of the color upper limit evaluation value and the average of the evaluation values of all clusters as the initial value of the color reference evaluation value. The evaluation value calculation unit 15 may set the initial value. Other operations are the same as those in the first embodiment.

According to the above-described fourth embodiment, time when an unknown change has occurred and clusters sensitive to the unknown change are extracted, which helps the administrator to search for a cause of defect.

Others

A series of processes by each configuration and function of the above-described process state analysis devices 10 and 10A can be executed by software.

Figure 19:
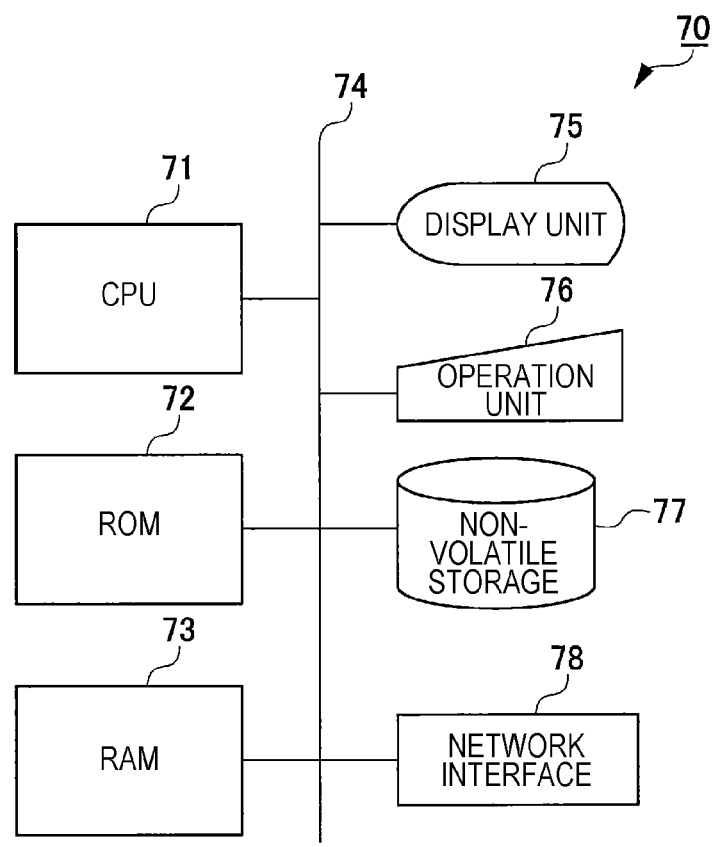
FIG. 19 is a block diagram showing a configuration example of hardware of a computer included in the process state analysis device.

FIG. 19 is a block diagram showing a hardware configuration example of a computer 70 included in the process state analysis device 10, 10A that executes the series of processes described above by software. The computer 70 includes a CPU (Central Processing Unit) 71, a ROM 72, a RAM 73, a display unit 75, an operation unit 76, a non-volatile storage 77, and a network interface 78. The respective units are connected to each other via a system bus 74 (corresponding to the internal bus 25) so that data can be transmitted and received between them.

The CPU 71, ROM 72, and RAM 73 constitute a control unit. The CPU 71 is an example of an arithmetic processing device. The ROM 72 is an example of a non-volatile memory (recording medium), and stores various programs and data necessary for the CPU 71 to operate. The RAM 73 temporarily stores variables, parameters, etc. generated in the process of arithmetic processing by the CPU 71. The CPU 71 reads and executes various programs stored in the ROM 72 to realize the data acquisition unit 12, the data preprocessing unit 13, the cluster analysis unit 14, the evaluation value calculation unit 15, and the graph display screen creating unit 16, which constitute the process state analysis device 10, 10A. The same applies to the unknown factor search unit 21 of the process state analysis device 10A. Note that instead of the CPU 71, another arithmetic processing device such as an MPU (Micro Processing Unit) may be used.

The display unit 75 and the operation unit 76 constitute the input/output device 30. The non-volatile storage 77 is an example of a recording medium, and functions as the process result data storage unit 18, the cluster condition storage unit 19, and the cluster result data storage unit 20. Various programs executed by the CPU 71 may be stored in the non-volatile storage 77. As the non-volatile storage 77, for example, a semiconductor memory, a hard disk, an SSD (Solid State Drive), a recording medium using magnetism or light, or the like is used. The network interface 78 corresponds to the communication I/F 17.

Further, the present invention is not limited to the above-described embodiment examples, and it is needless to say that other various application examples and modified examples can be taken without departing from the gist of the present invention described in the claims.

For example, each of the above-described embodiment examples is a detailed and specific description of the configurations of the process state analysis device and the plant monitoring system in order to explain the present invention in an easy-to-understand manner, and does not necessarily include all the components described. Further, it is possible to replace a part of the configuration of one embodiment example with the constituent elements of another embodiment example. It is also possible to add the constituent elements of another embodiment example to the configuration of one embodiment example. Further, other components may be added to, deleted from, or substituted for a part of the configuration of each embodiment example.

Further, each of the configurations, functions, processing units, etc. of the above-described process state analysis devices may be realized by hardware, for example, by designing part or all of them with an integrated circuit. Further, each component of the above-described process state analysis devices 10 and 10A may be mounted on any hardware as long as the respective hardware can transmit and receive information to and from each other via a network. Further, the processing executed by a certain processing unit may be realized by one piece of hardware, or may be realized by distributed processing by a plurality of pieces of hardware.

REFERENCE SIGNS LIST

1, 1A plant analysis system
10, 10A process state analysis device
14 cluster analysis unit
15 evaluation value calculation unit
16 graph display screen creating unit (graph creation unit)
18 process result data storage unit
20 cluster result data storage unit
20D cluster result data
42 process result database
42D process result data
51 measurement device
601 graph display screen
602 graph
603 graph legend
604 evaluation start date/time input frame
605 evaluation end date/time input frame
606 color reference evaluation value input frame
607 color upper limit evaluation value input frame
608 display start date/time input frame
609 display end date/time input frame
610 aggregation unit time

The invention claimed is:

1. A process state analysis device, comprising:
an evaluation value calculation unit that calculates an evaluation value for each cluster, for the cluster classified based on multi-dimensional process data output from a plurality of types of measurement devices installed in a target plant, in an evaluation value calculation range indicating a target range for calculating an evaluation value, which comprises a defective rate of the cluster calculated based on quality inspection result data for each measurement sample included in the cluster; and
a graph creation unit that determines a hue of a graph element of each cluster on the basis of the evaluation value of the cluster in the evaluation value calculation range calculated by the evaluation value calculation unit and a color reference evaluation value corresponding to the hue that is a reference of the graph element, and creates and outputs a graph representing the number of nodes belonging to each cluster for each aggregation unit time in a specified display period.

2. The process state analysis device according to claim 1, wherein
the evaluation value calculation unit, when the evaluation value calculation range is changed, recalculates the evaluation value for each cluster in the changed evaluation value calculation range, and
the graph creation unit uses the evaluation value recalculated for each cluster within the evaluation value calculation range to recreate a graph showing the number of nodes belonging to each cluster for each aggregation unit time in the specified display period.

3. The process state analysis device according to claim 1, wherein the graph creation unit, when the color reference evaluation value is changed, determines the hue of the graph element of each cluster on the basis of the evaluation value of the cluster in the evaluation value calculation range and the changed color reference evaluation value, and recreates the graph showing the number of nodes belonging to each cluster for each aggregation unit time in the specified display period.

4. The process state analysis device according to claim 2, wherein the hue of the graph element of the cluster is determined by the magnitude relationship and a magnitude of the difference between the evaluation value of the cluster and the color reference evaluation value in the evaluation value calculation range.

5. The process state analysis device according to claim 2, further comprising:
 an input unit that inputs the evaluation value calculation range and the color reference evaluation value; and
 a display unit that displays a screen including the graph created by the graph creation unit.

6. The process state analysis device according to claim 3, wherein the hue of the graph element of the cluster is determined by the magnitude relationship and a magnitude of the difference between the evaluation value of the cluster and the color reference evaluation value in the evaluation value calculation range.

7. The process state analysis device according to claim 3, further comprising:
 an input unit that inputs the evaluation value calculation range and the color reference evaluation value; and
 a display unit that displays a screen including the graph created by the graph creation unit.

8. A process state analysis device, comprising:
 an evaluation value calculation unit that calculates an evaluation value for each cluster, for the cluster classified based on multi-dimensional process data output from a plurality of types of measurement devices installed in a target plant, in an evaluation value calculation range indicating a target range for calculating an evaluation value, which is a value of an evaluation item of the cluster; and
 a graph creation unit that determines a hue of a graph element of each cluster on the basis of the evaluation value of the cluster in the evaluation value calculation range calculated by the evaluation value calculation unit and a color reference evaluation value corresponding to the hue that is a reference of the graph element, and creates and outputs a graph representing the number of nodes belonging to each cluster for each aggregation unit time in a specified display period;
 wherein the evaluation value calculation unit, when the evaluation value calculation range is changed, recalculates the evaluation value for each cluster in the changed evaluation value calculation range;
 wherein the graph creation unit uses the evaluation value recalculated for each cluster within the evaluation value calculation range to recreate a graph showing the number of nodes belonging to each cluster for each aggregation unit time in the specified display period;
 wherein the hue of the graph element of the cluster is determined by the magnitude relationship and a magnitude of the difference between the evaluation value of the cluster and the color reference evaluation value in the evaluation value calculation range; and
 wherein the graph creation unit, when a color boundary evaluation value is set, determines a hue of a graph element of the cluster in which the magnitude of the difference between the evaluation value of the cluster and the color reference evaluation value exceeds the magnitude of the difference between the color boundary evaluation value and the color reference evaluation value as the same hue as the hue corresponding to the color boundary evaluation value.

9. A process state display method, comprising the processes of:
 calculating an evaluation value for each cluster, for the cluster classified based on multi-dimensional process data output from a plurality of types of measurement devices installed in a target plant, in an evaluation value calculation range indicating a target range for calculating the evaluation value, which comprises a defective rate of the cluster calculated based on quality inspection result data for each measurement sample included in the cluster;
 determining a hue of a graph element of each cluster on the basis of the evaluation value of the cluster in the evaluation value calculation range and a color reference evaluation value corresponding to the hue that is a reference of the graph element, and creating a graph representing the number of nodes belonging to each cluster for each aggregation unit time in a specified display period; and
 outputting the graph to a display unit.

10. A process state analysis device, comprising:
 an evaluation value calculation unit that calculates an evaluation value for each cluster, for the cluster classified based on multi-dimensional process data output from a plurality of types of measurement devices installed in a target plant, in an evaluation value calculation range indicating a target range for calculating an evaluation value, which is a value of an evaluation item of the cluster; and
 a graph creation unit that determines a hue of a graph element of each cluster on the basis of the evaluation value of the cluster in the evaluation value calculation range calculated by the evaluation value calculation unit and a color reference evaluation value corresponding to the hue that is a reference of the graph element, and creates and outputs a graph representing the number of nodes belonging to each cluster for each aggregation unit time in a specified display period;
 wherein the graph creation unit, when the color reference evaluation value is changed, determines the hue of the graph element of each cluster on the basis of the evaluation value of the cluster in the evaluation value calculation range and the changed color reference evaluation value, and recreates the graph showing the number of nodes belonging to each cluster for each aggregation unit time in the specified display period;
 wherein the hue of the graph element of the cluster is determined by the magnitude relationship and a magnitude of the difference between the evaluation value of the cluster and the color reference evaluation value in the evaluation value calculation range; and
 wherein the graph creation unit, when a color boundary evaluation value is set, determines a hue of a graph element of the cluster in which the magnitude of the difference between the evaluation value of the cluster and the color reference evaluation value exceeds the magnitude of the difference between the color boundary evaluation value and the color reference evaluation value as the same hue as the hue corresponding to the color boundary evaluation value.

* * * * *